United States Patent
Kaizu et al.

(10) Patent No.: US 9,420,193 B2
(45) Date of Patent: Aug. 16, 2016

(54) IMAGE PICKUP APPARATUS, METHOD OF CONTROLLING IMAGE PICKUP APPARATUS, AND PROGRAM

(75) Inventors: Shun Kaizu, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 14/000,647

(22) PCT Filed: Jan. 26, 2012

(86) PCT No.: PCT/JP2012/051601
§ 371 (c)(1),
(2), (4) Date: Aug. 21, 2013

(87) PCT Pub. No.: WO2012/117774
PCT Pub. Date: Sep. 7, 2012

(65) Prior Publication Data
US 2013/0329128 A1   Dec. 12, 2013

(30) Foreign Application Priority Data

Mar. 1, 2011 (JP) ................................ 2011-044254

(51) Int. Cl.
*H04N 5/235* (2006.01)
*H04N 5/232* (2006.01)
(Continued)

(52) U.S. Cl.
CPC ........... *H04N 5/2353* (2013.01); *H04N 5/2329* (2013.01); *H04N 5/2355* (2013.01);
(Continued)

(58) Field of Classification Search
CPC ... H04N 5/2353; H04N 5/353; H04N 5/3535; H04N 5/35536; H04N 5/35554; H04N 5/35581; H04N 5/2329; H04N 5/2355; H04N 5/3532; H04N 5/374
USPC .......... 348/220.1, 221.1, 222.1, 229.1, 230.1, 348/294, 295, 296, 297, 298, 299, 362, 363, 348/364, 365, 366, 367, 368, 370, 371
See application file for complete search history.

(56) References Cited

U.S. PATENT DOCUMENTS

2008/0284873 A1* 11/2008 Miyanari ............... H04N 5/235 348/229.1
2011/0043674 A1* 2/2011 Takane ................. H04N 5/2351 348/296

(Continued)

FOREIGN PATENT DOCUMENTS

JP   11-041523   2/1999
JP   2000-152057   5/2000
(Continued)

OTHER PUBLICATIONS

Gu et al., Coded Rolling Shutter Photography: Flexible Space-Time Sampling. IEEE International Conference on Computational Photography (ICCP) Mar. 2010.

*Primary Examiner* — Twyler Haskins
*Assistant Examiner* — Peter Chon
(74) *Attorney, Agent, or Firm* — Chip Law Group

(57) ABSTRACT

An apparatus and a method are provided, which realize image pickup processing in which setting of an exposure time is performed in units of regions in an image pickup apparatus. An electronic shutter control unit that controls an exposure start time of an image pickup device by an electronic shutter operation and a mechanical shutter control unit that controls an exposure end time of the image pickup device by a mechanical shutter operation. The electronic shutter control unit calculates the exposure start time in units of image regions based on an exposure time individually set in units of image regions, and an operation time of the mechanical shutter in units of image regions, and controls the electronic shutter to operate at the calculated exposure start time in units of image regions. For example, the exposure time control in units of regions is executed by subtracting a mechanical shutter an exposure time from a mechanical shutter operation time in units of row blocks, for example, and calculating a reset time serving as an exposure start time as an electronic shutter operation time.

12 Claims, 15 Drawing Sheets

(51) Int. Cl.
*H04N 5/355* (2011.01)
*H04N 5/353* (2011.01)
*H04N 5/374* (2011.01)

(52) U.S. Cl.
CPC ........... *H04N5/3532* (2013.01); *H04N 5/3535* (2013.01); *H04N 5/35554* (2013.01); *H04N 5/374* (2013.01)

(56) References Cited

U.S. PATENT DOCUMENTS

2011/0149129 A1* 6/2011 Kim ................... H04N 5/2351 348/296
2011/0149130 A1* 6/2011 Takane ............... H04N 5/23248 348/296
2011/0181754 A1* 7/2011 Iwasaki .................. H04N 5/353 348/230.1

FOREIGN PATENT DOCUMENTS

| | | |
|---|---|---|
| JP | 2000-278595 | 10/2000 |
| JP | 2006-157862 | 6/2006 |
| JP | 2006-253876 | 9/2006 |
| JP | 2008-118573 | 5/2008 |
| JP | 2008-219523 | 9/2008 |
| JP | 2010-004489 | 1/2010 |
| JP | 4689620 | 5/2011 |
| WO | WO 2006/049098 | 5/2006 |

* cited by examiner

FIG. 5
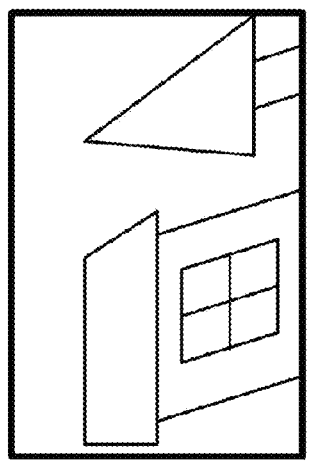
(A)
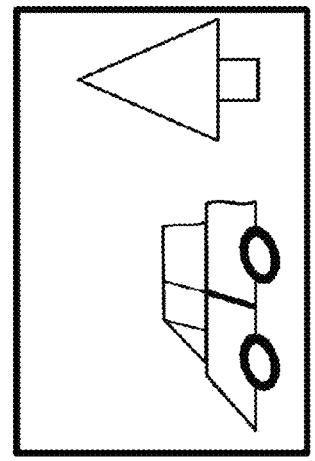
(B)
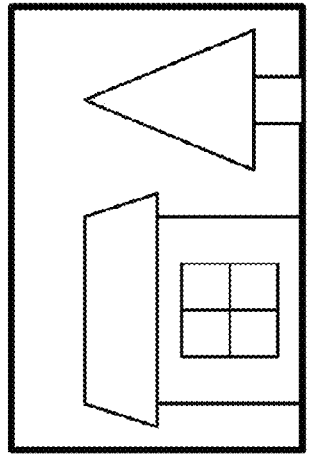
(C)
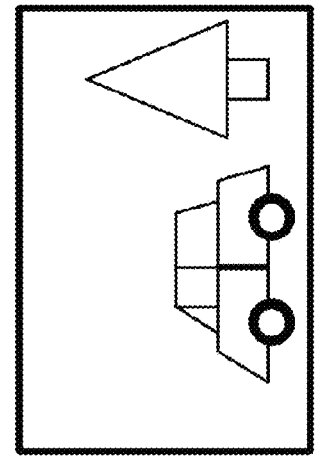
(D)

FIG. 13

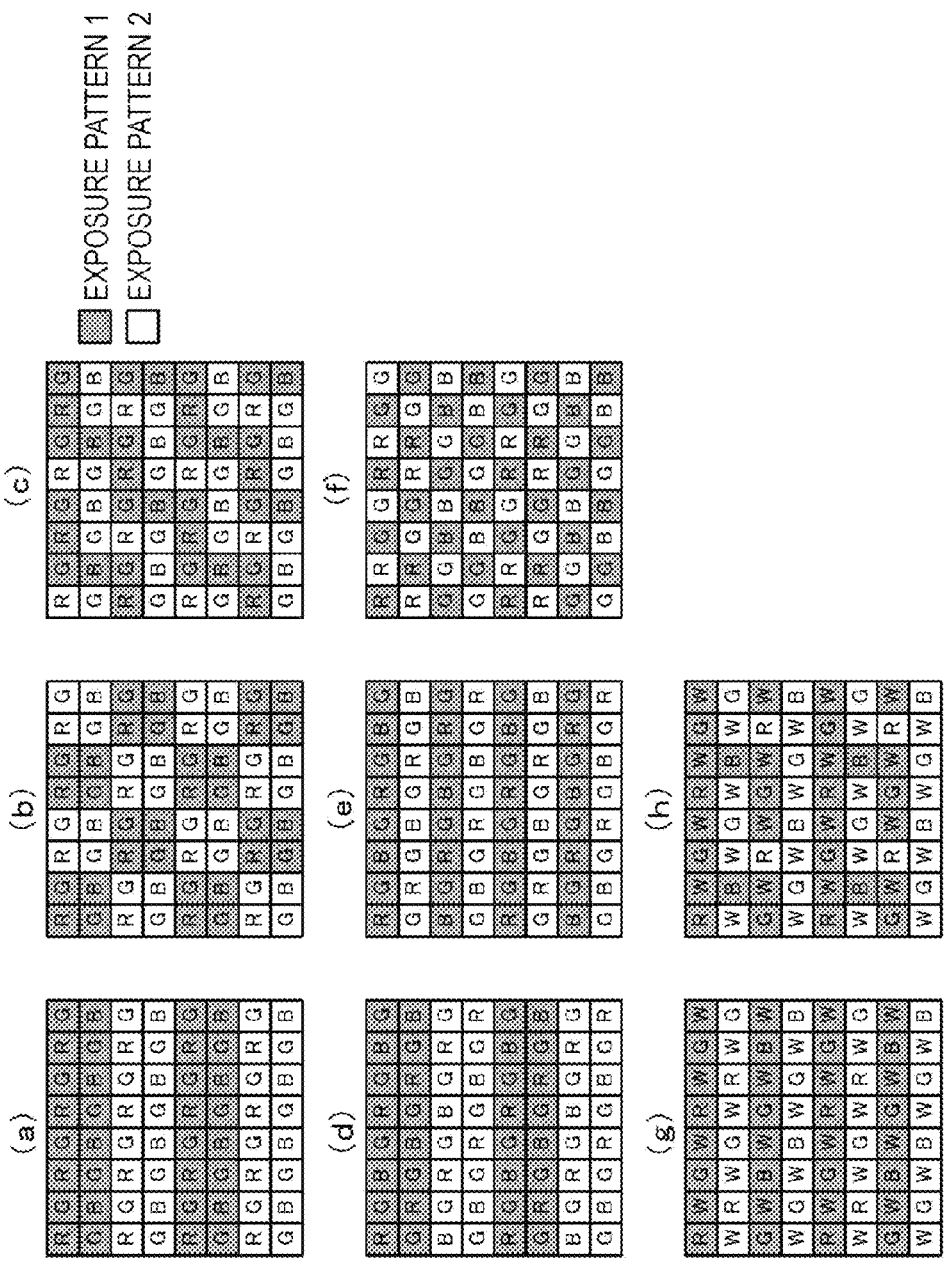

IMAGE PICKUP APPARATUS, METHOD OF CONTROLLING IMAGE PICKUP APPARATUS, AND PROGRAM

TECHNICAL FIELD

The present invention relates to an image pickup apparatus, a method of controlling an image pickup apparatus, and a program. To be specific, an image pickup apparatus, a method of controlling an image pickup apparatus and a program that executes readout of pixel values of a photographed image as row sequential readout processing.

BACKGROUND ART

Hereinafter, an outline of the following two technologies related to exposure control processing will be described as background technologies.

(1) A focal-plane shutter operation and occurrence of distortion (2) Dynamic range expansion processing by exposure time control (shutter control)

(1) A Focal-Plane Shutter Operation and Occurrence of Distortion

First, a focal-plane shutter operation and occurrence of distortion will be described.

As a shutter operation system of image photographing processing in an image pickup apparatus, there is a shutter operation that controls exposure start and exposure end from one direction of an image pickup device surface. This shutter operation is called a focal-plane shutter operation or a rolling shutter operation. For example, there is a characteristic such that the exposure times between rows are slightly shifted when the exposure start and the exposure end are controlled from an upper row to a lower row of the image pickup device.

A configuration of a CMOS image sensor and an example of photographing processing will be described as an example of the image pickup device having a focal-plane shutter operation function with reference to FIG. 1.

FIG. 1 is a diagram illustrating apart of a configuration of an image pickup device (CMOS image sensor) 101. The image pickup device (CMOS image sensor) 101 is configured from a vertical scanning circuit 102, a horizontal scanning circuit 103, and a plurality of pixels 104 arranged in an array manner.

Electric charges are accumulated in a photodiode inside a pixel 104 by exposure processing associated with photographing of an object.

The electric charges accumulated in the photodiode of each pixel are output to a vertical signal line 113 through an amplifier transistor and a transfer transistor. A signal current output to the vertical signal line 113 is further supplied to the horizontal scanning circuit 103, is subjected to predetermined signal processing, and is then output outside through a signal output line 114.

Since vertically aligned pixels are commonly connected to the vertical signal line 113, to independently read out a signal of each pixel, only a signal of one pixel at a time should be output to the vertical signal line 113.

That is, in the image pickup device (CMOS image sensor) 101, a signal is read out from each of pixels 104d aligned in the lowermost row, first, as illustrated in FIG. 2(A). The readout of signals from the row of pixels 104c is performed, next, as illustrated in FIG. 2(B). Then, the readout of signals by changing the row is performed in sequence, so that the signal of each pixel can be independently read out. A control signal of the readout of pixels is, for example, output from a horizontal reset line 111 and a horizontal select line 112 connected to the vertical scanning circuit 102 illustrated in FIG. 1.

Each of the pixels 104 that configure the image pickup device (CMOS image sensor) starts exposure again immediately after the readout processing of the accumulated electric charges. That is, the exposure processing for a next image frame is started.

In this way, when the readout processing is executed in sequence in units of rows, and the exposure processing is started immediately afterwards, start times and end times of exposure of the photodiode 104a in the head row and the photodiode 104d in the bottom row are different, that is, a gap occurs between exposure times (or exposure periods).

This is a characteristic of the shutter operation, called a focal-plane shutter operation or a rolling shutter operation.

Note that, although only the four rows of 104a to 104d are illustrated in the drawing, this illustrates only a part of the image pickup device. A large number of rows, such as several hundred to several thousands of rows, are set in an actual image pickup device, and the readout is executed in a unit of each row in sequence.

An example of start and end timings of exposure of each row, and a start timing of readout of the electric charges will be described with reference to FIGS. 3 and 4.

In both of FIGS. 3 and 4, the horizontal axis represents a time axis and the vertical axis represents a row.

For example, in FIG. 3, a time gap occurs in the readout timings of the electric charges in units of rows, as illustrated in the drawing with the dotted lines 151a, a, and 151b.

A plurality of rectangular blocks illustrated in FIG. 3 illustrates an exposure time of a given photographed image frame, and is an exposure time in units of row blocks made of a row or a plurality of rows.

Immediately after the timing illustrated in the readout line 151a of an image frame photographed in advance, the exposure processing is started. As illustrated in the readout line 151a, the exposure start times are slightly shifted in units of rows. In the graph illustrated in the drawing, an upper side row is started to expose in advance, and rows toward a lower side is started to expose later.

The uppermost row has the exposure start time at a time (t1), and the bottommost row has the exposure start time at a time (t2).

The right end of the plurality of rectangular blocks illustrated in FIG. 3 is a timing at which the readout processing of an exposed image is executed, and accumulated electric charges of pixels in each row is read out at a timing illustrated in the readout line 151b.

In this example, the exposure end time≈the readout processing time, and as illustrated in the readout line 151b of FIG. 3, the readout processing of pixels in each row is performed from a head row in sequence.

The uppermost row has the exposure end time at a time (t2), and the bottommost row has the exposure end time at a time (t3).

Note that, in this example, since the exposure starts and the exposure ends of each row have gaps at the same timing in units of rows, the exposure times of all rows are the same.

FIG. 4 illustrates exposure processing and readout timing corresponding to images of two consecutive photographed frames at the time of photographing a moving image.

As illustrated in FIG. 4, a preceding photographed frame N has the exposure time during a period of readout lines 152a to 152b, and the readout of pixel values from each row is executed at the timing illustrated in the readout line 152b.

A subsequent photographed frame N+1 has the exposure time during readout lines 152b to 152c, and the readout of pixel values from each row is executed at the timing illustrated in the readout line 152c.

In the example illustrated in FIG. 4, the preceding photographed frame N has:

the exposure start time, in which the uppermost row has a time (t1a), and the bottommost row has a time (t1b), and the exposure end time, in which the uppermost row has a time (t1b), and the bottommost row has a time (t1c).

The subsequent photographed frame N+1 has:

the exposure start time, in which the uppermost row has a time (t2a), and the bottommost row has a time (t2b), and the exposure end time, in which the uppermost row has a time (t2b), and the bottommost row has a time (t2c).

In the example illustrated in FIG. 4, for example, the exposure time of the bottommost row of the preceding photographed frame N and the exposure time of the uppermost row of the subsequent photographed frame N+1 are almost the same period of time. That is, a phenomenon occurs, in which lower side image data of the preceding image frame and upper side image data of the subsequent frame are images at almost the same period of time.

As a result, for example, when a moving object is photographed, or when photographing processing is performed, in which the camera itself is moved during exposure, distortion occurs in an image due to the gap of exposure times between rows caused by a focal-plane shutter operation.

An example of image distortion will be described with reference to FIG. 5.

FIG. 5(A) is a photograph example photographed with the camera being stopped.

FIG. 5(B) is a photograph example photographed while the camera is moved in a lateral direction.

While distortion does not occur in the image of FIG. 5(A), distortion occurs in the image illustrated in FIG. 5(B).

Similarly, FIG. 5(C) is a photograph example when a car is photographed with being stopped.

FIG. 5(D) is a photograph example when a car is photographed with being moved.

While distortion does not occur in the image of FIG. 5(C), distortion occurs in the image illustrated in FIG. 5(D).

Such distortion occurs because there is a gap between the exposure times of the image pickup device described with reference to FIGS. 3 and 4, that is, the exposure times are slightly different from an upper end row to a lower end row. This occurrence phenomenon of distortion is referred to as a focal-plane shutter phenomenon, or a rolling shutter phenomenon.

The image pickup device that performs a focal-plane shutter operation is capable of obtaining a photographed image without distortion or having reduced distortion by mechanically shading light reaching the image pickup device.

A digital camera that employs a mechanical focal-plane shutter (hereinafter, a mechanical shutter) used in a silver halide camera has been known. That is, the digital camera has a configuration in which a front curtain that controls exposure start and a back curtain that controls exposure end are performed by mechanical shutters as dousers. The widths of these two curtains are adjusted to control the exposure time. The speed of the mechanical shutter is higher than the focal-plane shutter (readout scanning of the sensor) of the image pickup device, and a photographed image having reduced distortion can be obtained.

Patent Documents 1 and 2 disclose a configuration using an electronic shutter as the front curtain that controls the exposure start and using a mechanical shutter (douser) as the back curtain that controls the exposure end. The electronic shutter that is the front curtain is performed by reset scanning of pixels in time with travelling of the mechanical shutter that is the back curtain. That is, it is a method of reading out a signal after the mechanical shutter that is the back curtain is closed and the pixels are shaded.

Patent Document 1 discloses a configuration in which only the electronic shutter is used in the exposure start and the exposure end when a moving image is photographed, and the exposure start is controlled by the electronic shutter and the exposure end is controlled by the mechanical shutter when a still image is photographed. This configuration enables the photographing of a moving image as well as a sufficiently accurate shutter operation even when a still image is photographed.

Patent Document 2 describes an effect of reducing a mechanical shutter that controls the exposure start by controlling the exposure start by the electronic shutter and controlling the exposure end by the mechanical shutter.

Patent Documents 1 and 2 only disclose a configuration in which the exposure time, that is, the time from start to end of exposure is the same length in all pixels.

(2) Dynamic Range Expansion Processing by Exposure Time Control (Shutter Control)

Next, dynamic range expansion processing by exposure time control (shutter control) will be described.

A dynamic range of a photographed image can be expanded by controlling the exposure time to each pixel of the image pickup device.

In a bright object region, if the exposure time is made longer, the accumulated electric charges of a pixel are saturated, and an accurate pixel value cannot be obtained.

Meanwhile, in a dark object region, if the exposure time is made longer, an accurate pixel value corresponding to object luminance can be easily obtained.

Therefore, in the region where the object is bright, a pixel value of a pixel, in which the exposure time is set short, is obtained as an effective pixel value. Meanwhile, in the region where an object is dark, a pixel value of a pixel, in which the exposure time is set longer, is obtained as an effective pixel value. A method of expanding the dynamic range is to combine these values to generate an output image. Note that, in outputting a final pixel value, pixel value adjustment processing based on the exposure time is executed.

Patent Documents 3 and 4, and Non Patent Document 1 disclose a technology in which a different exposure time is set in each pixel row of the image pickup device, and the dynamic range of a photographed image is expanded. For example, it is configured such that a short time exposure row and a long time exposure row are set in every other pixel row of the image pickup device.

For example, Patent Document 3 discloses a configuration in which a high sensitive pixel (long time exposure pixel) and a low sensitive pixel (short time exposure pixel) are set by causing the electronic shutter operation of the CMOS image sensor to perform different operations in even rows and in an odd rows. A high dynamic range image can be photographed by combination of pixel values according to object luminance.

Patent Document 4 discloses a configuration in which two patterns of exposure times are set in each row, or in each of a plurality of rows with more than one row, and the patterns are changed by an electronic shutter operation. Further, Patent Document 4 also discloses a method in which three patterns of exposure times are set, and are set in units of rows according to the brightness of a portion of a screen.

Further, Non Patent Document 1 discloses a configuration in which arbitrary exposure time control can be further freely performed in units of rows. The technique of Non Patent Document 1 is a configuration in which a dynamic range can be expanded by setting an individual exposure time in units of rows according to the brightness of an image.

The configurations of Patent Documents 3 and 4, and Non Patent Document 1 execute the exposure time control in units of regions by a configuration using an electronic shutter.

Further, Patent Document 5 discloses a configuration, in which processing that executes reset scanning twice in every one row in an alternate manner, the reset scanning once resetting the electric charges accumulated in each pixel by the electronic shutter, or multiple reset processing that executes the reset processing three times at the rate of once in every three rows is performed, and the exposure control by a configuration of a mechanical shutter and an electronic shutter used in combination is performed, so that the photographing with a plurality of predetermined different exposure times in units of rows is performed, and the dynamic range is expanded.

However, Patent Document 5 described above has a configuration in which a plurality of different exposure times is set in units of rows in advance and the photographing is performed, and does not have a configuration in which adaptive exposure time control is performed according to the luminance of an object.

(3) Summary of Related Art

As described above, in the configuration using a focal-plane shutter, a gap of an exposure period occurs in units of rows, and distortion caused by the gap occurs.

Further, while the technology of expanding the dynamic range by performing exposure period control in units of regions has been known, even in this configuration, a gap of an exposure period in units of rows cannot be prevented when a focal-plane shutter is used, and distortion caused by the gap occurs.

CITATION LIST

Patent Document

Patent Document 1: JP 11-41523 A
Patent Document 2: JP 2000-152057 A
Patent Document 3: JP 2006-253876 A
Patent Document 4: Japanese Patent Application No. 2006-542337
Patent Document 5: JP 2008-118573 A Non Patent Document Non Patent Document 1: Jenwei Gu et al, Coded Rolling Shutter Photography: Flexible Space-Time Sampling, Computational Photography (ICCP), 2010.

SUMMARY OF THE INVENTION

Problems to be Solved by the Invention

As described above, an image pickup device that performs a focal-plane operation is subject to distortion in a photographed image at the time of photographing a moving object.

The present invention has been made in view of the foregoing, and an objective of the present invention is to provide an image pickup apparatus, a method of controlling an image pickup apparatus, and a program that capable of suppressing distortion in a photographed image in an image pickup device that performs a focal-plane operation.

Further, in a configuration of an embodiment of the present invention, an objective is to provide an image pickup apparatus, a method of controlling an image pickup apparatus, and a program that realize adaptive exposure time control in units of regions according to the brightness of the object in a configuration in which an electronic shutter and a mechanical shutter are used in combination.

Further, in a configuration of an embodiment of the present invention, an objective is to provide an image pickup apparatus, a method of controlling an image pickup apparatus, and a program that enable photographing of a wide dynamic range image having less distortion in photographing an image by a focal-plane shutter operation.

Solutions to Problems

A first aspect of the present invention is an image pickup apparatus including:
an image pickup device;
an electronic shutter control unit configured to control an exposure start time of the image pickup device by an electronic shutter operation; and
a mechanical shutter control unit configured to control an exposure end time of the image pickup device by a mechanical shutter operation,
wherein the electronic shutter control unit calculates an exposure start time in units of image regions based on an exposure time individually set in units of image regions, and an operation time of the mechanical shutter in units of image regions, and controls an electronic shutter to operate at the calculated exposure start time in units of image regions.

Further, in an embodiment of the image pickup apparatus of the present invention, the image pickup apparatus includes an exposure time calculation unit configured to calculate an exposure time of a subsequent photographed image in units of image regions according to luminance information in units of image regions obtained from a preliminary photographed image, wherein the electronic shutter control unit calculates an exposure start time in units of image regions based on the exposure time in units of image regions calculated by the exposure time calculation unit, and an operation time of the mechanical shutter in units of image regions, and controls the electronic shutter to operate at the calculated exposure start time in units of image regions.

Further, in an embodiment of the image pickup apparatus of the present invention, the exposure time calculation unit executes exposure time calculation processing in units of image regions, in which an exposure time of the subsequent photographed image is set to be a long time for an image region having low luminance in units of image regions and obtained from the preliminary photographed image, and an exposure time of the subsequent photographed image is set to be a short time for an image region having high luminance in units of image regions and obtained from the preliminary photographed image.

Further, in an embodiment of the image pickup apparatus of the present invention, the exposure time calculation unit calculates an exposure time of the subsequent photographed image frame in units of image regions according to the luminance information obtained from a preceding photographed image frame of an image frame configuring a photographed moving image when the moving image is photographed.

Further, in an embodiment of the image pickup apparatus of the present invention, the image pickup apparatus includes an exposure time calculation unit configured to calculate an exposure time in units of row blocks configured from one or more rows as an image region according to luminance information based on a preliminary photographed image, wherein the electronic shutter control unit has a configuration configured to calculate an exposure start time in units of image regions based on the exposure time in units of row blocks calculated by the exposure time calculation unit, and an operation time of the mechanical shutter in units of row blocks, and to control an electronic shutter to operate at the calculated exposure start time in units of image regions, and calculates an exposure start time of a row block i: In according to the following expression:

$$Tri = Tmi - Texi$$

where a row block number is i,
the exposure time of the row block i is Texi, and
a mechanical shutter operation time of the row block i is Tmi.

Further, in an embodiment of the image pickup apparatus of the present invention, the image pickup apparatus includes an exposure time calculation unit configured to calculate an exposure time in units of matrix blocks configured from one or more pixels as an image region according to luminance information based on a preliminary photographed image, wherein the electronic shutter control unit has a configuration configured to calculate an exposure start time in units of image regions based on the exposure time in units of matrix blocks calculated by the exposure time calculation unit, and an operation time of the mechanical shutter in units of rows, and to control an electronic shutter to operate at the calculated exposure start time in units of image regions, and calculates an exposure start time of a matrix block ij: Trij according to the following expression:

$$Trij = Tmi - Texij$$

where a row block number is i, a line block number is j,
the exposure time of the matrix block ij is Texij, and
a mechanical shutter operation time of the matrix block ij is Tmi.

Further, in an embodiment of the image pickup apparatus of the present invention, the image pickup device is an image pickup device configured to execute pixel value readout processing in units of rows in sequence, and the mechanical shutter control unit controls the mechanical shutter to operate at a time preceding the pixel value readout processing of the image pickup device to terminate the exposure time.

Further, in an embodiment of the image pickup apparatus of the present invention, the electronic shutter control unit outputs a reset signal resetting an electric charge accumulated in each pixel of the image pickup device, in units of image regions of the image pickup device, and sets the exposure time of a unit of each image region as a time from outputting of the reset signal to the operation time of the mechanical shutter, and perform exposure time control in units of image regions.

Further, in an embodiment of the image pickup apparatus of the present invention, the image pickup apparatus further includes a signal processing unit configured to input an image output by an image pickup device by image pickup processing in which different exposure times are set in units of image regions, and to calculate a pixel value of the output image by multiplying a gain corresponding to a reciprocal number of the exposure time to the input image.

Further, in an embodiment of the image pickup apparatus of the present invention, the image pickup apparatus further includes a sensitivity difference compensation unit configured to execute luminance comparison between a first image photographed without operating the mechanical shutter and a second image photographed with operating the mechanical shutter, to calculate a difference between a calculated exposure time in units of regions set to the second image and an actual exposure time of the actually photographed second image in units of regions based on information of the luminance comparison, and to execute pixel value correction compensating the calculated difference between the exposure times.

Further, a second aspect of the present invention is a method of controlling an image pickup apparatus executed in the image pickup apparatus, the method including:
an electronic shutter control step of controlling an exposure start time of an image pickup device by an electronic shutter operation by an electronic shutter control unit; and
a mechanical shutter control step of controlling an exposure end time of the image pickup device by a mechanical shutter operation, executed by a mechanical shutter control unit,
wherein the electronic shutter control step executes
a step of calculating an exposure start time in units of image regions based on an exposure time individually set in units of image regions, and an operation time of the mechanical shutter in units of image regions, and
a step of controlling an electronic shutter to operate at the calculated exposure start time in units of image regions.

Further, a third aspect of the present invention is a program for causing an image pickup apparatus to execute image pickup processing executing:
an electronic shutter control step of causing an electronic shutter control unit to control an exposure start time of an image pickup device by an electronic shutter operation, and
a mechanical shutter control step of causing a mechanical shutter control unit to control an exposure end time of the image pickup device by a mechanical shutter operation, and
the electronic shutter control step executes
a step of calculating an exposure start time in units of image regions based on an exposure time individually set in units of image regions, and an operation time of the mechanical shutter in units of image regions, and
a step of controlling an electronic shutter to operate at the calculated exposure start time in units of image regions.

Note that the program of the present invention is a program provided to an information processing apparatus or a computer system capable of executing various program codes, with a storage medium, for example. Such a program is executed in a program execution unit in the information processing apparatus or in the computer system, so that processing according to the program is realized.

Other objectives, characteristics, and advantages of the present invention will become clear by further detailed description based on the embodiments of the present invention described below and the appended drawings. Note that the system in the present specification is a theoretical assembled configuration made of a plurality of devices, and is not limited to one having devices in configurations in the same housing.

Effects of the Invention

According to an embodiment of the present invention, an apparatus and a method are provided, which realize setting of exposure times in units of regions in the image pickup apparatus, and photographing of an image having reduced image distortion.

To be specific, an electronic shutter control unit that controls an exposure start time of the image pickup device by an electronic shutter operation, and a mechanical shutter control unit that controls an exposure end time of the image pickup device by a mechanical shutter operation, are included. The electronic shutter control unit calculates an exposure start time in units of image regions based on an exposure time individually set in units of predetermined image regions, such as in units of row blocks, and an operation time of a mechanical shutter in units of image regions, and operates an electronic shutter at the calculated exposure start time in units of image regions.

For example, the exposure time is subtracted from the mechanical shutter operation time in units of row blocks, and a reset time as the exposure start time is calculated as an electronic shutter operation time, so that exposure time control in units of regions is executed.

With this processing, exposure control set in an arbitrary exposure time becomes possible in units of image regions, and a time difference between rows of the exposure end times can be reduced by the mechanical shutter, whereby, for example, the image distortion likely to occur at the time of photographing a moving object can be reduced.

BRIEF DESCRIPTION OF DRAWINGS

FIG. 5 is a diagram describing an example of occurrence of image distortion as a problem in the image pickup processing by the focal-plane operation.

FIG. 13 is a diagram describing an example of region division of an image pickup device that performs exposure time control in units of predetermined regions.

FIG. 15 is a diagram describing an example of region division of an image pickup device that performs exposure time control in units of predetermined regions.

MODE FOR CARRYING OUT THE INVENTION

Figure 1:
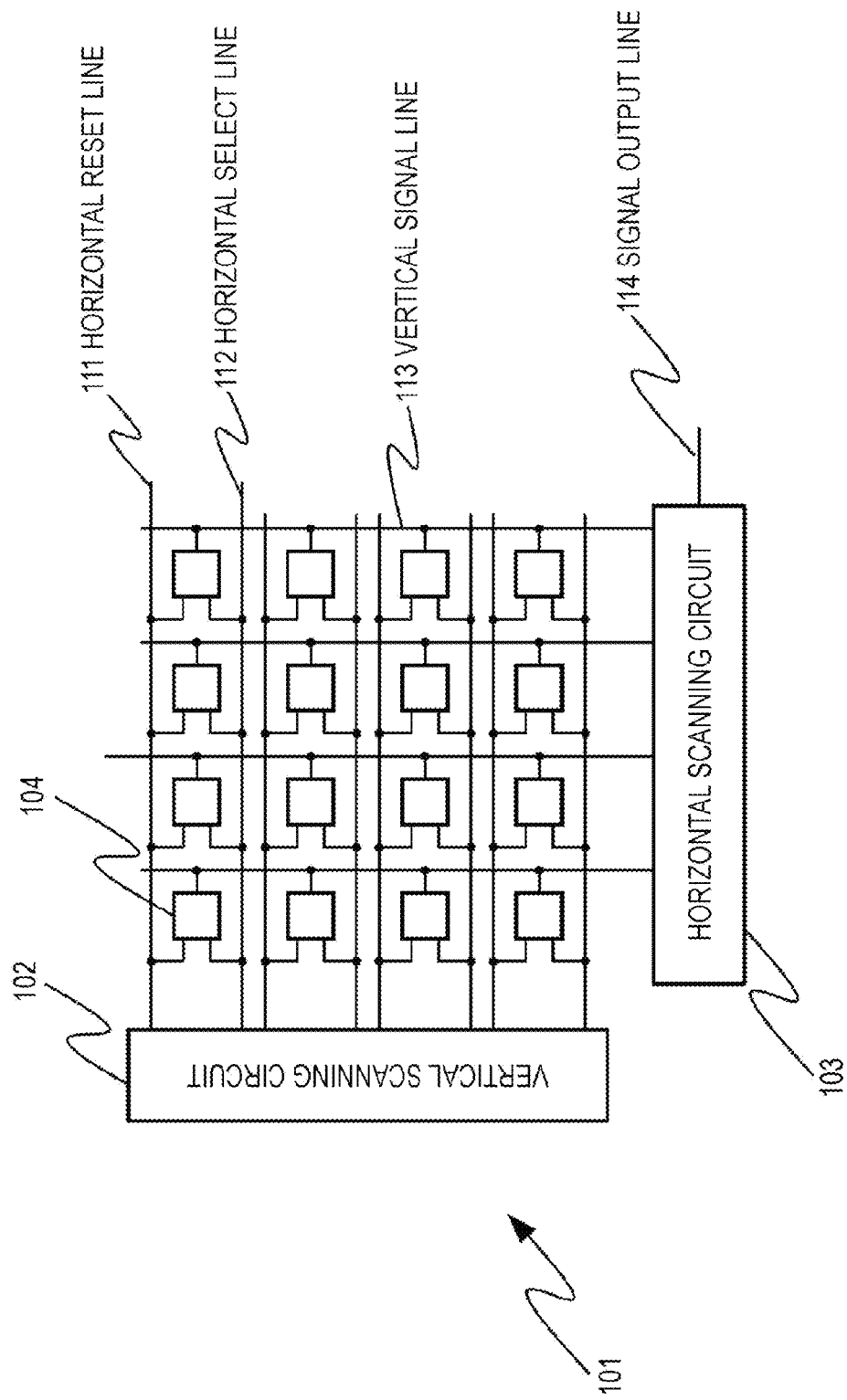
FIG. 1 is a diagram describing a configuration of an image pickup device and image pickup processing.
Figure 2:
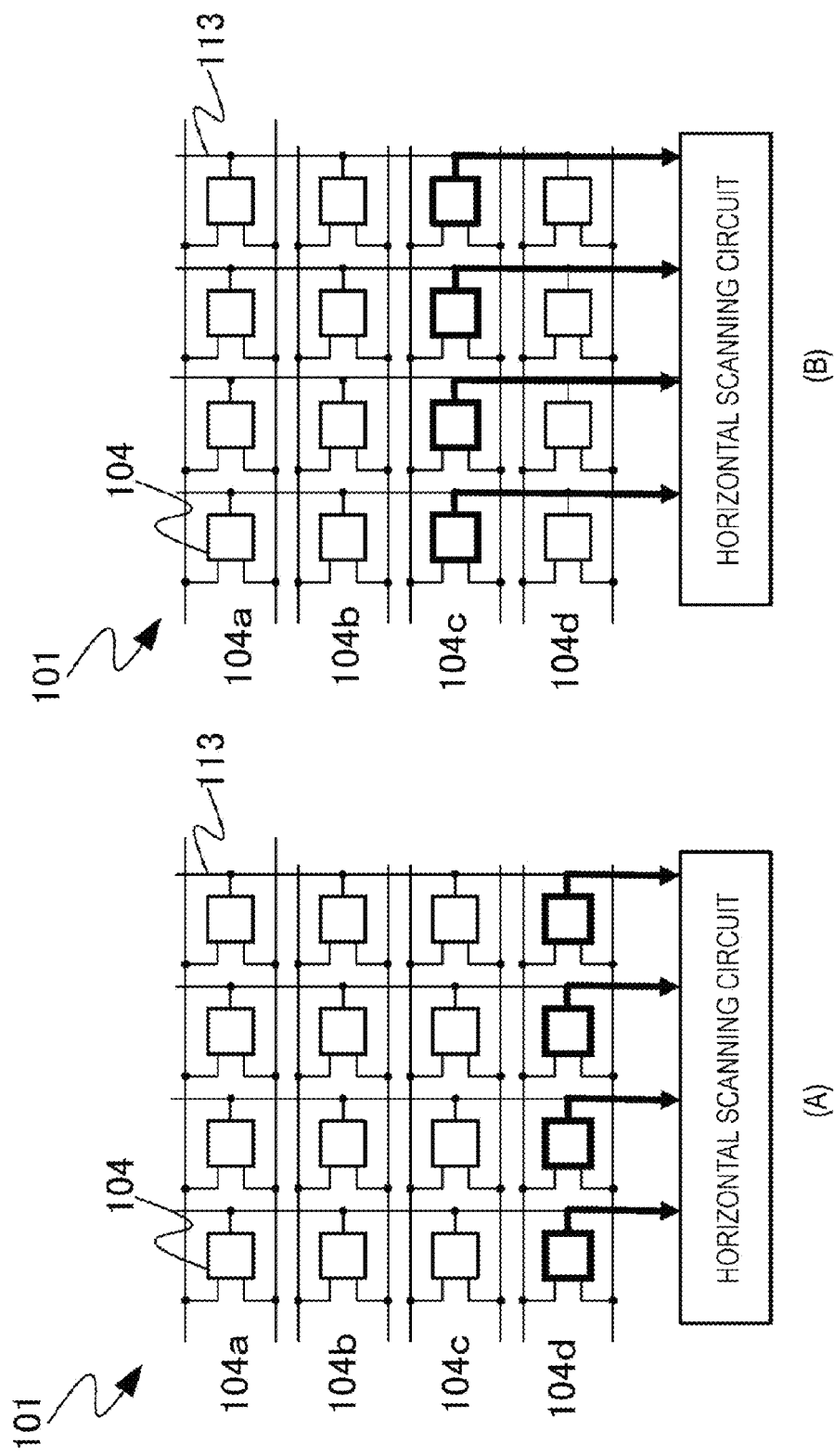
FIG. 2 is a diagram describing a configuration of an image pickup device and image pickup processing.
Figure 3:
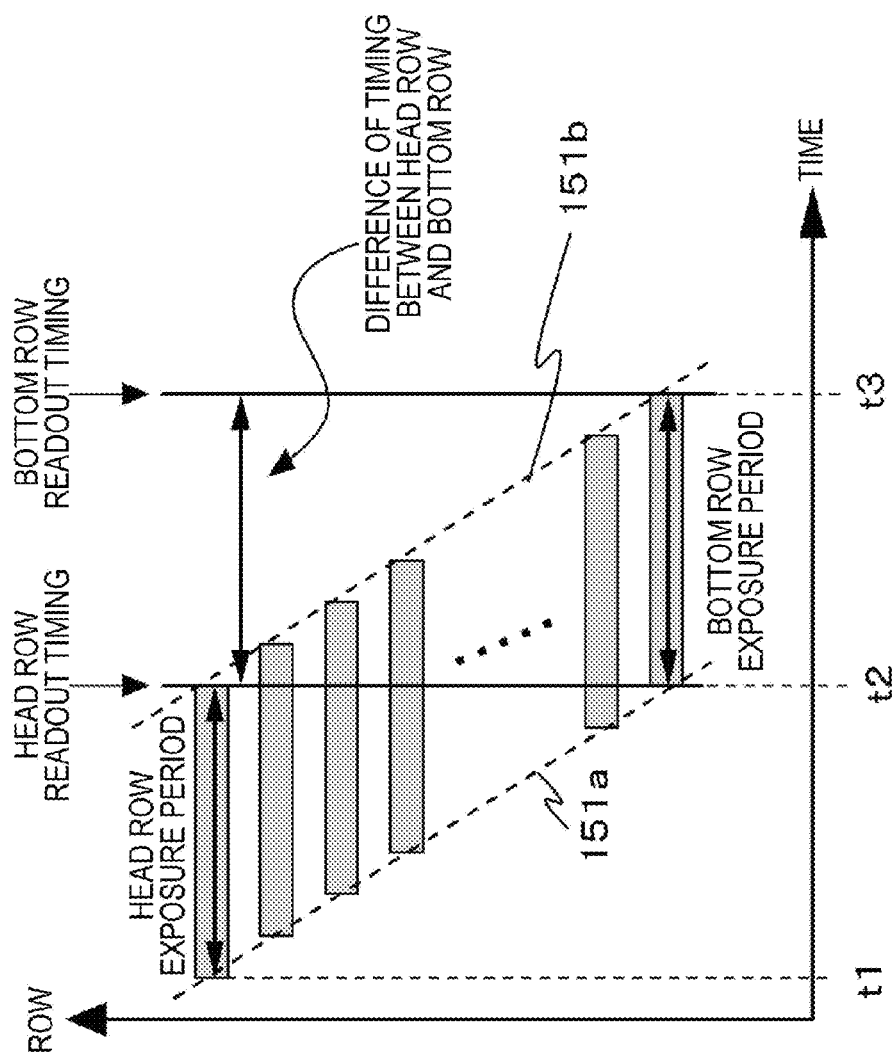
FIG. 3 is a diagram describing an image pickup processing sequence by a focal-plane operation.
Figure 4:
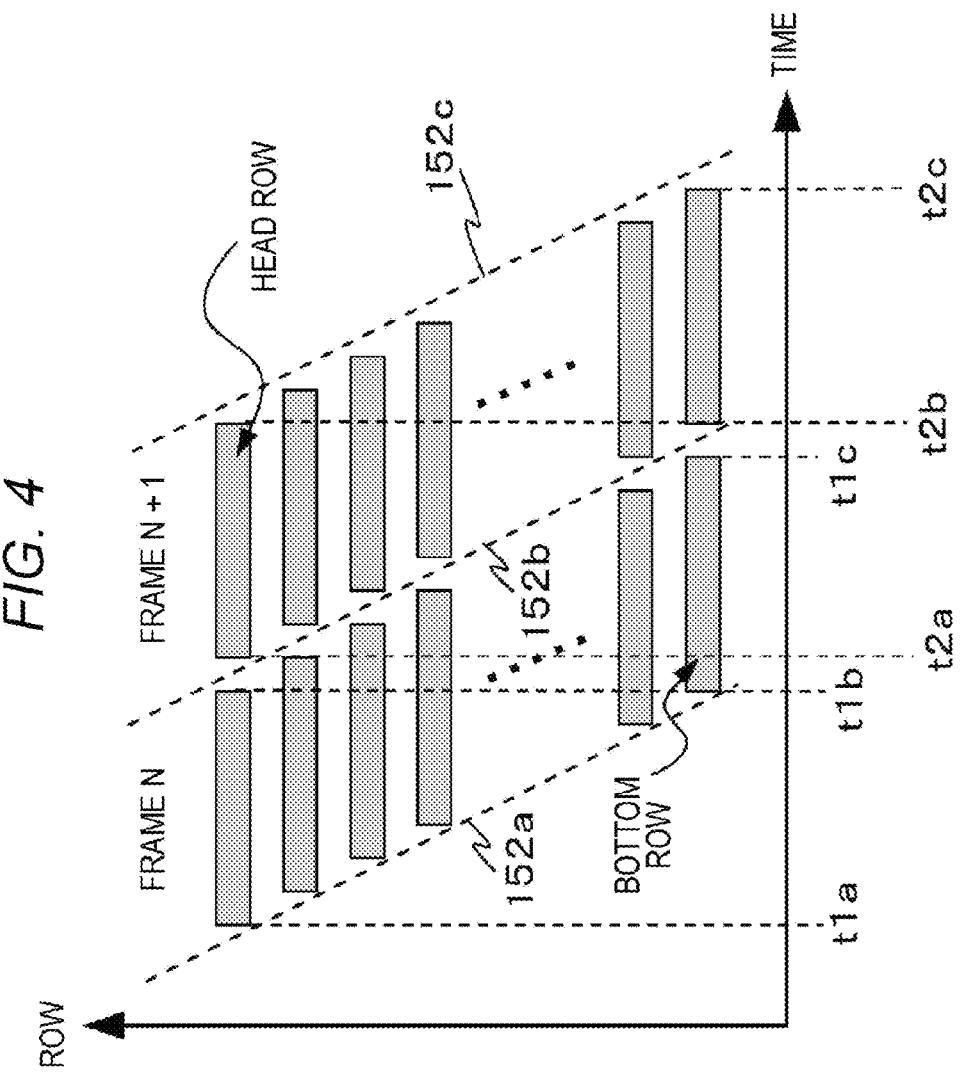
FIG. 4 is a diagram describing an image pickup processing sequence by a focal-plane operation.

Hereinafter, details of an image pickup apparatus, a method of controlling an image pickup apparatus, and a program of the present invention will be described with reference to the drawings. Description will be given according to the following items.

1. A configuration example of an image pickup apparatus
2. A basic configuration of exposure time control in units of regions using an electronic shutter
3. Exposure time calculation processing in units of regions in an exposure time calculation unit
4. Exposure time control processing in units of regions by electronic shutter control in consideration of a mechanical shutter operation
5. Other embodiments
6. Correction processing responding to an operation change of a mechanical shutter

[1. A Configuration Example of an Image Pickup Apparatus]

First, a part of a configuration of an image pickup apparatus will be described with reference to FIG. 6.

Figure 6:
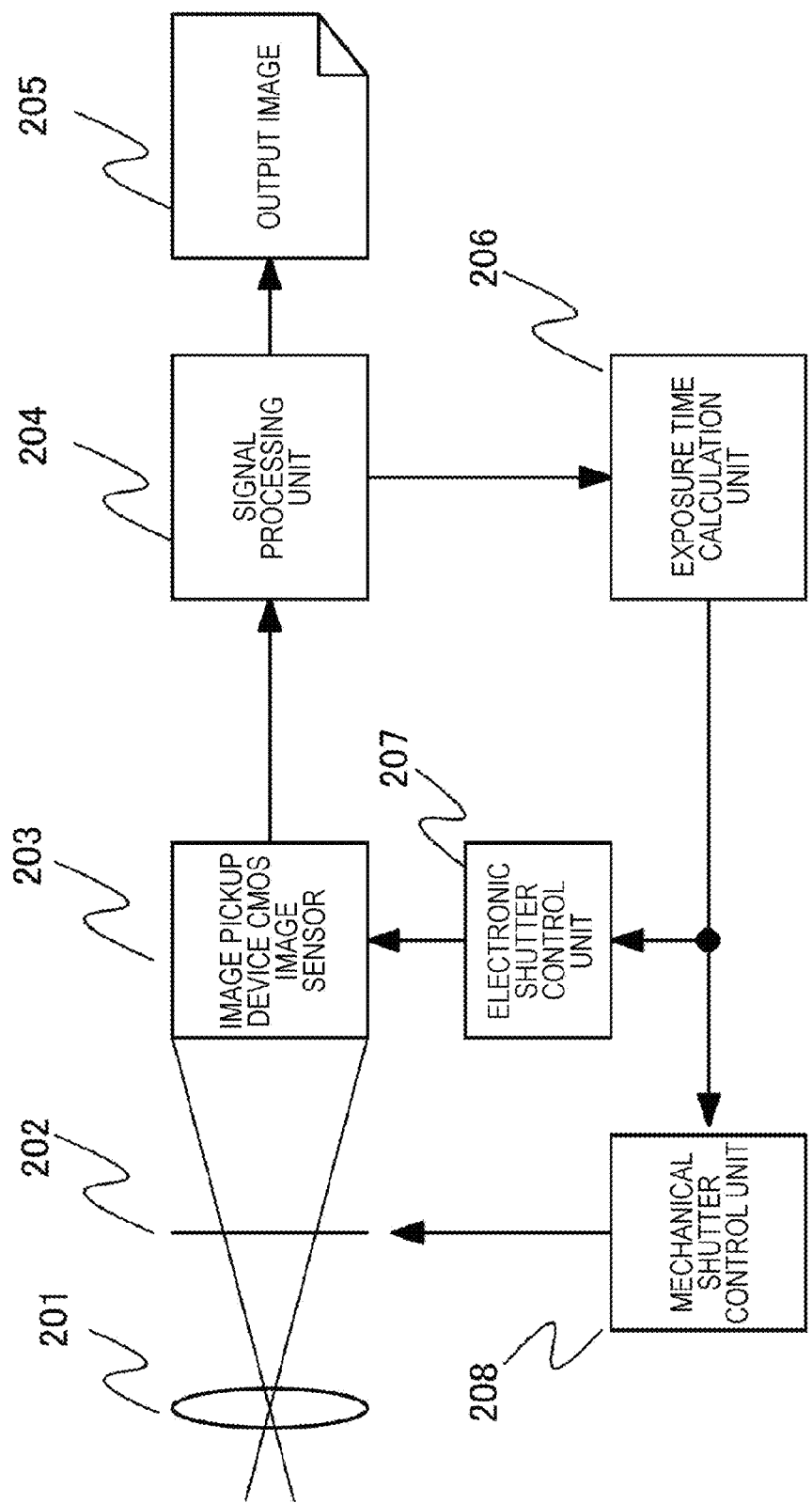
FIG. 6 is a diagram describing a configuration and processing of an image pickup apparatus.

As illustrated in FIG. 6, an image pickup apparatus includes an optical lens 201, a mechanical shutter 202 configured from so-called a douser, an image pickup device 203 configured from a CMOS image sensor and the like, a signal processing unit 204, an exposure time calculation unit 206, an electronic shutter control unit 207, and a mechanical shutter control unit 208.

Note that the image pickup apparatus is capable of photographing a moving image and a still image, and realizes exposure time control in units of regions according to object luminance.

For example, at the time of photographing a moving image, the luminance information in units of regions is acquired in a preceding image frame, and the exposure time control in units of regions is performed in the next photographed frame based on measured luminance information of the units of regions.

At the time of photographing a still image, the luminance information in units of regions is acquired using the last photographed of a photographed image, and at the time of photographing a still image to be photographed, exposure time control in units of regions is performed based on measured luminance information in units of regions.

Incident light through the optical lens 201 enters the image pickup device (CMOS image sensor) 203 during the mechanical shutter 202 is open, the electric charges is accumulated in each pixel according to the incident light, and a photoelectrically converted signal based on the accumulated electric charges is output to the signal processing unit 204 as image data.

The image pickup device (CMOS image sensor) 203 has a similar configuration to the one described above with reference to FIG. 1. Note that, although details will be described below, the image pickup device (CMOS image sensor) 203 has a configuration capable of controlling an exposure time in units of regions.

The signal processing unit 204 applies predetermined image processing to the input image, for example, applies image processing such as white balance adjustment processing and gamma correction processing to generate and output an output image 205. In addition, the signal processing unit 204 adjusts, in consideration of an exposure time of a photographed image in units of regions, an output pixel value by multiplying a gain of a reciprocal number of the exposure time in each region. The output image 205 is generated by performing the above-described processing.

Further, the signal processing unit 204 calculates a luminance component in units of regions of an image photographed in advance as information for the exposure time control in units of regions at the time of photographing the next image, and outputs the calculated data to the exposure time calculation unit 206.

The exposure time calculation unit 206 determines an exposure time (shutter time) of the image in units of regions based on the luminance component in units of image regions input from the signal processing unit 204, for example, and determines exposure time information in units of image regions to the electronic shutter control unit 207.

The electronic shutter control unit 207 controls an operation timing of the electronic shutter that controls exposure start (front curtain) to control an exposure start time of the CMOS image sensor 203 based on the exposure time (shutter time) in units of regions determined by the exposure time calculation unit 206 and a predetermined operation timing of the mechanical shutter.

Meanwhile, the mechanical shutter control unit 208 operates the mechanical shutter 202 that controls exposure end (back curtain) at a predetermined timing preceding pixel readout processing of the image pickup device.

The mechanical shutter 202 includes a shutter curtain (douser) corresponding to the back curtain that terminates the exposure processing as illustrated in FIG. 7(A), and travels at a predetermined speed in the row direction as illustrated in FIG. 7(B).

In FIG. 7(B), the vertical axis represents a row of the image pickup device and the horizontal axis represents a time. By the operation of the mechanical shutter 202, rows at an upper side are shared in sequence, and the bottommost row is lastly shaded.

As an example, in a row L1, which is a given row in the image pickup device, light is reached and the electric charges is accumulated during a period before a time T1, but is shaded by the manical shutter 202 and the accumulation of the electric charges to the pixel is stopped on and after the exposure time T1.

[2. A Basic Configuration of Exposure Time Control in Units of Regions Using an Electronic Shutter]

Next, a basic configuration of the exposure time control in units of regions using the electronic shutter will be described.

The image pickup device 203 is an image sensor capable of setting different exposure times in units of predetermined pixel regions.

As an example, an exposure control configuration that enables setting of different exposure times in units of rows will be described with reference to FIG. 8.

Figure 8:
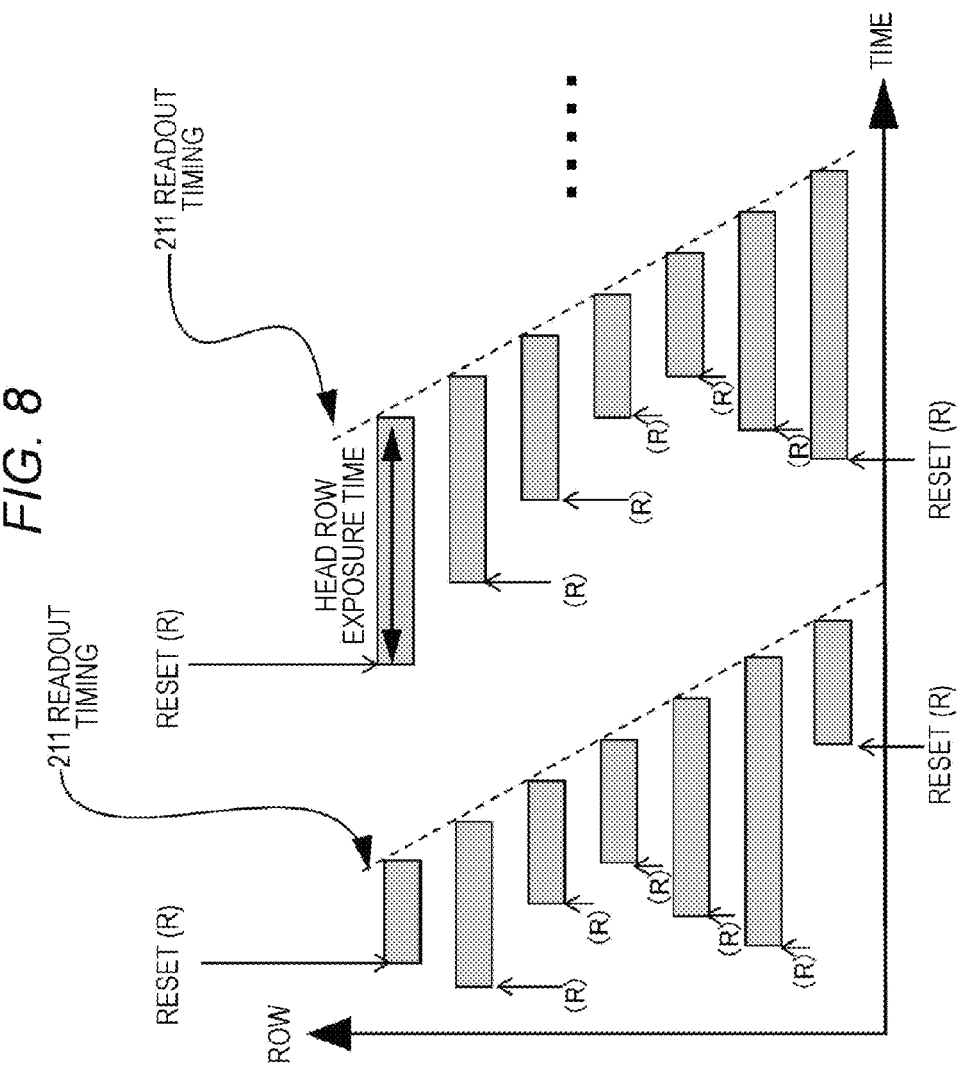
FIG. 8 is a diagram describing an example of setting processing of an exposure time in units of regions.

Note that, in FIG. 8, to describe the basic configuration of the exposure time control in units of rows, the mechanical shutter 202 is described as being in an open state (open) over an entire period.

A plurality of rectangular blocks illustrated in FIG. 8 illustrates an exposure time in units of row blocks made of a row or a plurality of rows.

A readout timing performs readout in sequence in every row in a conventional manner according to the focal-plane operation. A line 211 illustrated in FIG. 8 represents the readout timing. The readout processing at a timing shifted by a certain time is performed in each unit of row by sequential scanning in units of rows.

Immediately after the readout processing illustrated in the line 211, the next electric charge accumulation of pixels in the image pickup device is instantly started, and reset scanning in which the electric charges accumulated after the readout processing illustrated in the line 211 is reset is executed by an electronic shutter operation.

That is, a reset (R) signal illustrated in FIG. 8 is output by the electronic shutter operation in units of rows, and an exposure start timing is controlled in each row.

The reset (R) signal illustrated in FIG. 8 is a signal by the electronic shutter operation, and resets the electric charges accumulated after the readout processing. The electric charges accumulated in the pixels from the readout processing of the line 211 to the reset (R) signal is reset.

As a result, the period from the reset (R) signal to the next readout signal line 211 (the rectangular block illustrated in the drawing) is set as an accumulation period of the electric charges corresponding to the pixel value.

As illustrated in FIG. 8, the reset signal (R) can be output at different timings in units of row blocks made of units of rows or of a plurality of rows, and can set different exposure times in units of row blocks made of units of rows or of a plurality of rows.

To be specific, in a region where an object is bright, the exposure time is set short. Meanwhile, in a region where an object is dark, the exposure time is set long. An image having a wide dynamic range can be output by generating an output image by combining the above. Note that, in outputting a final pixel value, pixel value adjustment processing based on each exposure time is executed.

Note that, in the example illustrated in FIG. 8, description has been given by omitting the mechanical shutter as the back curtain that controls the exposure end time. However, a utilizing configuration of the mechanical shutter as the back curtain that controls the exposure end time will be described below.

The image signal obtained from the image pickup device 203 is output to the signal processing unit 204.

The signal processing unit 204 performs, in consideration of the exposure time of each row described with reference to FIG. 8, processing of multiplying a gain of a reciprocal number of the exposure time. With this processing, an image having a wide dynamic range and a favorable S/N can be obtained.

That is, in a region where an object is bright, the pixel value obtained by setting the exposure time short is obtained, while in a region where an object is dark, the pixel value obtained by setting the exposure time long is obtained, and an output image is generated by combining these pixel values. With this processing, an image having a wide dynamic range can be output. Note that, in outputting a final pixel value, the processing of multiplying a gain of a reciprocal number of the exposure time is executed as pixel value adjustment processing based on each exposure time.

The signal processing unit 204 performs camera signal processing similar to a conventional one, such as white balance adjustment processing and gamma correction processing, and obtains the output image 205.

Further, the signal processing unit 204 calculates, as described above, a luminance component of the image photographed in advance in units of regions as information for the exposure time control in units of regions at the time of photographing an image, and outputs the luminance component to the exposure time calculation unit 206. For example, the luminance component is a luminance image like the one illustrated in FIG. 9(A).

[3. Processing of Calculating an Exposure Time in Units of Regions by an Exposure Time Calculation Unit]

Next, processing of calculating an exposure time in units of regions in an exposure time calculation unit will be described.

The exposure time calculation unit 206 inputs luminance information in units of image regions from the signal processing unit 204. For example, the luminance image illustrated in FIG. 9(A) is obtained.

The luminance image illustrated in FIG. 9(A) is configured from the luminance information of pixels of an object in a photographed image.

Note that, as described above, in the image photographing processing of a still image, preliminary photographing is performed immediately before an image frame photographed the user, and obtains a luminance image from the preliminary photographed frame. The exposure time control of a next image frame photographed by the user is performed in units of regions using the obtained luminance information.

Further, in photographing a moving image, a luminance image like the one illustrated in FIG. 9(A) is obtained using an image of the preceding photo graphed frame. That is, the luminance image is obtained from the preceding photographed image frame, and the exposure time control of a subsequent photographed image is performed in units of regions using the luminance information.

First, the exposure time calculation unit 206 divides the luminance image obtained from the signal processing unit 204 into row blocks made of a plurality of rows as illustrated in FIG. 9(A).

Next, a luminance statistic in units of row blocks as illustrated in FIG. 9(B). The vertical axis represents a row and the horizontal axis represents a luminance statistic in FIG. 9(B). The luminance statistic is a statistic that indicates the brightness of each row block. For example, a luminance average value of a block and the like is used.

In the example illustrated in FIG. 9(B), the uppermost row block is a row block having the highest luminance, and the bottommost row block is a row block having the lowest luminance.

The luminance statistic in units of row blocks illustrated in FIG. 9(B) corresponds to the luminance image illustrated in FIG. 9(A). The uppermost row block of the luminance image illustrated in the FIG. 9(A) is a bright object like the sky, and the average luminance of the uppermost row block is high. Meanwhile, the bottommost row block is a dark object like soil, and the average luminance of the bottommost row block is low.

As described above, the exposure time calculation unit 206 acquires the luminance image illustrated in FIG. 9(A) from the signal processing unit 204 to generate a luminance statistic in units of regions illustrated in FIG. 9(B) (in the present embodiment, in units of row blocks).

The exposure time calculation unit 206 further calculates an exposure time to be set in units of regions (in the present example, in units of row blocks) as illustrated in FIG. 9(C) based on the luminance statistic in units of regions illustrated in FIG. 9(B).

Note that, as described above, the exposure time in the units of regions is calculated based on a preliminary picked-up image in photographing a still image, and is applied to a still image next photographed by the user.

In processing of photographing a moving image, the exposure time is calculated based on the preceding photographed image, and is applied to a next photographed image frame.

The exposure time calculation unit 206 performs the following processing in calculation of the exposure time:
a short exposure time is set to a bright region, that is, a high luminance region, and
a long exposure time is set to a dark region, which is a low luminance region.

By executing the setting of an exposure time in units of regions, saturation of pixel values is prevented in the high luminance region, and an effective pixel value can be obtained. In addition, a pixel value having a high S/N can be obtained in the low luminance region.

As illustrated in FIG. 9(C),
the exposure time of the uppermost row block that is a row block having the highest luminance is set low, and
the exposure time of the bottommost row block that is a row block having the lowest luminance is set long.

With this processing, a pixel value can be obtained, in which the S/N of each region from the high luminance region to the low luminance region has been improved, and an image having a wide dynamic range and a favorable S/N can be photographed.

The exposure time calculation unit 206 determines the exposure time in units of regions (in this example, in units of row blocks) by the above-described processing, and outputs the determined exposure time information in units of regions to the electronic shutter control unit 207.

[4. Processing of Controlling an Exposure Time in Units of Regions by Electronic Shutter Control in Consideration of a Mechanical Shutter Operation]

Next, processing of controlling an exposure time in units of regions by electronic shutter control in consideration of a mechanical shutter operation will be described.

The electronic shutter control unit 207 performs shutter control based on the exposure time information in units of regions. To be specific, control of the exposure start time of the image pickup device (CMOS image sensor) 203 is executed by the electronic shutter control unit 207.

In controlling an individual, processing in consideration of an operation timing of the mechanical shutter 202 controlled by the mechanical shutter control unit 208 is performed.

Details of the processing will be described with reference to FIG. 10.

FIG. 10(A) illustrates a setting result of the exposure time in units of regions (in this example, in units of row blocks) calculated by the exposure time calculation unit 206 illustrated in FIG. 9(C). That is, setting information of the exposure time in units of regions calculated based on the luminance of the object.

In the setting example of the exposure time illustrated in FIG. 10(A),
the setting of the exposure time of the uppermost row block that is a row block having the highest luminance is short, and
the setting of the exposure time of the bottommost row block that is a row block having the lowest luminance is long.

FIG. 10(B) is a diagram illustrating an example of the shutter control for executing the exposure time control in units of regions according to the exposure time in units of regions illustrated in FIG. 10(A).

FIG. 10(B) illustrates an exposure timing of a representative row of each row block.

Figure 10:
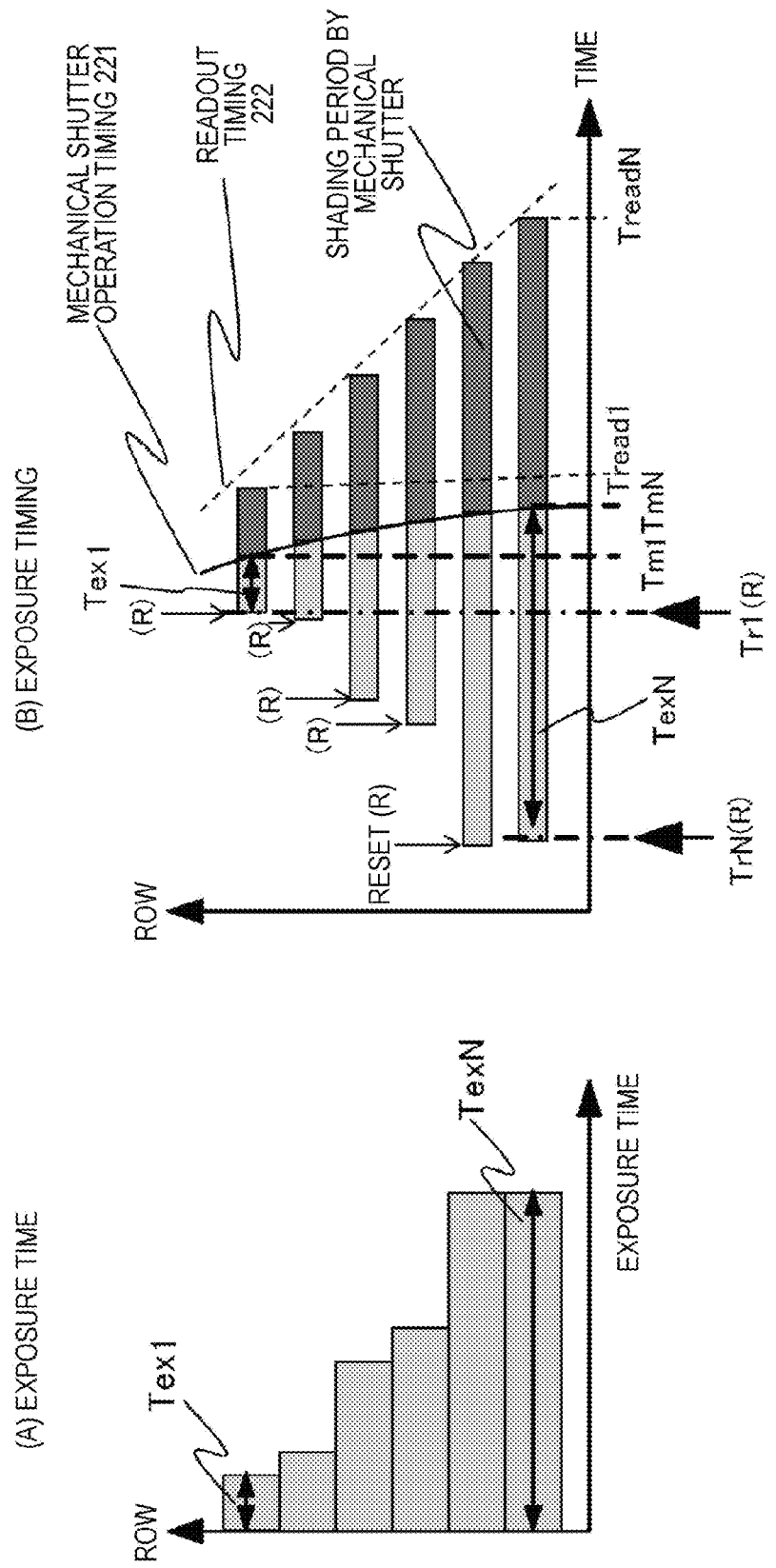
FIG. 10 is a diagram describing an example of processing of exposure time control in units of regions executed by an image pickup apparatus.

Note that the row block is made of a plurality of rows, but for the purpose of simple description, in FIG. 10(B), only one representative row is selected from one row block, and the exposure timing of the representative row is illustrated. In the following description related to FIG. 10, a "row" means the representative row of a row block.

FIG. 10(B) is a graph in which the vertical axis represents a row of the image pickup device, and the horizontal axis represents a time.

The reset signal (R) is an electronic shutter operation timing serving as an exposure start time of each row.

The electric charges accumulated in the pixels of each row is reset before an input of the reset signal (R), and the electric charges accumulated in the pixels during a period from the input of the reset signal (R) to the mechanical shutter timing 221 illustrated in FIG. 10(B) are output as a pixel value.

It is a shading period on and after the mechanical shutter timing 221, and sequential readout processing of the pixel value is then executed at a readout timing 222 in units of rows. That is, the readout processing of the pixel value is performed according to the focal-plane operation.

Note that the vertical scanning circuit of the image pickup device 203 has a circuit that generates a reset pulse at a timing of the electronic shutter in each row like the one illustrated in FIG. 10(B).

Note that FIG. 10 illustrates:
(a) an input of the reset (R) signal,
(b) the mechanical shutter operation timing 221, and
(c) the readout timing 222
of one image frame. For example, at the time of photographing a moving image, the processing of these (a), (b), and (c) is repeatedly executed in units of frames.

As illustrated in FIG. 10(A), in the setting example of the exposure time based on the luminance of the preceding photographed image in units of regions,
the exposure time of a representative row of the head row block (hereinafter, referred to as head row) is set to be Tex1, and
the exposure time of a representative row of the last row block (hereinafter, referred to as bottom row) is set to be TexN.

Figure 9:
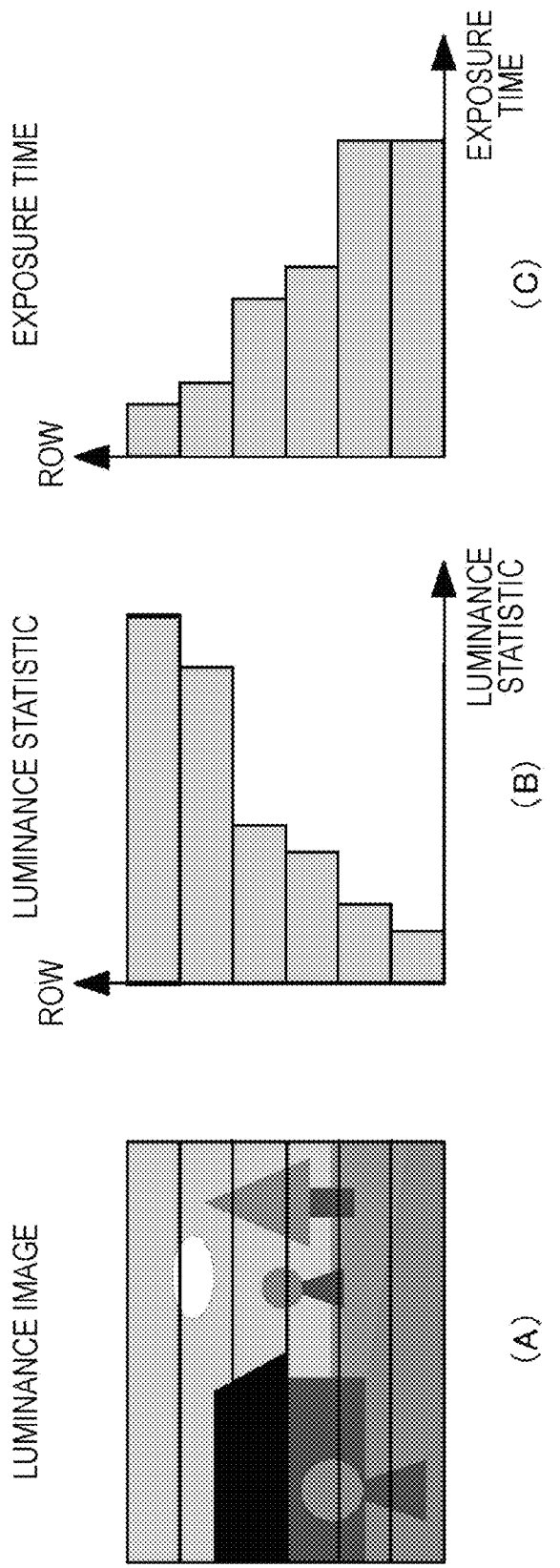
FIG. 9 is a diagram describing an example of calculation processing of an exposure time in units of regions calculated based on a luminance image, a luminance statistic, and luminance information.

The set exposure times in the units of regions are, as described with reference to FIG. 9 above, the exposure times in units of regions calculated by the exposure time calculation unit 206 based on the luminance information of the preceding photographed image of units of regions.

The mechanical shutter control unit 208 controls, as illustrated in FIG. 10(B), the mechanical shutter to start earlier than the readout 222 of the image pickup device.

The electronic shutter control unit 207 controls an output timing of the reset signal (R) in units of regions according to the setting of the exposure time in units of regions illustrated in FIG. 10(B). That is, the output timing of the reset signal (R) as the exposure start time is determined in units of rows, and is output to the image pickup device 203.

The operation timing of the electronic shutter is determined based on the setting information of the exposure time in units of regions and the mechanical shutter operation timing 221 illustrated in FIG. 10(B).

As illustrated in FIG. 10(B), the mechanical shutter timing 221 that functions as the back curtain that terminates the exposure time is controlled to start earlier than the readout 222 of the image pickup device. The scanning speed of the mechanical shutter is known, and, as illustrated in FIG. 10(B),
the operation timing of the mechanical shutter of the head row is represented as Tm1, and
the operation timing of the mechanical shutter of the bottom row is represented as TmN.

The electronic shutter control unit 207 determines the electronic shutter operation timing at which the reset signal (R) functioning as the front curtain that starts the exposure time is output from these pieces of information.

For example, as illustrated in FIG. 10(B),
the electronic shutter operation timing of the head row is Tr1, and
the electronic shutter operation timing of the bottom row is TrN.

The electronic shutter control unit 207 calculates Tr1 and TrN with the following expressions.

$$Tr1 = Tm1 - Tex1$$

$$TrN = TmN - TexN$$

where,
Tm1 represents the operation timing of the mechanical shutter of the head row,
TmN represents the operation timing of the mechanical shutter of the bottom row,
Tex1 represents the exposure time of the head row, and
TexN is the exposure time of the bottom row.
With the above described expressions,
the electronic shutter operation timing of the head row: Tr1, and
the electronic shutter operation timing of the bottom row: TrN
are calculated.

Regarding other rows, the electronic shutter operation timing (an output timing of the reset signal (R)) is calculated according to similar calculation expressions.

For example, the electronic shutter timing Tri of a row is calculated with the following expression:

$$Tri = Tmi - Texi$$

where,
Tmi is the operation timing of the mechanical shutter in the row i, and
Texi is the exposure time in the row i.

As described above, the image pickup apparatus of the present embodiment sets
the mechanical shutter operation timing 221 that defines the exposure end time ahead of the readout timing 222, and
determines electronic shutter operation timing (output timing of the reset signal (R)) as the exposure start time in units of regions base on the mechanical shutter operation timing 221 in units of regions and the exposure time setting information (FIG. 10(A)) in units of regions.

By performing the processing, the exposure time setting in units of regions (in the present embodiment, in units of row blocks) illustrated as the rectangular block on the left side of the mechanical shutter operation timing 221 illustrated in FIG. 10(B) is realized.

This exposure time in units of regions is based on the preceding photographed image that has performed the luminance measurement, and sets the exposure time that reflects the brightness of the object.

In this way, according to the configuration of the present embodiment, setting processing of the exposure time in units of regions based on the object luminance in units of regions is realized. As a result, even in a case where an object having a wide range of luminance from a high luminance region to a low luminance region is photographed, the saturation of the pixel value in the high luminance region is prevented, and the obtainment of the effective pixel value having less noise in the low luminance region becomes possible, whereby an image having a wide dynamic range can be output. Note that, when setting of different exposure times is performed, the output image is generated in the signal processing unit 204, as described above, by performing a pixel value adjustment with a gain value according to the exposure time.

Further, in the image pickup apparatus of the present embodiment, as illustrated in FIG. 10(B), the mechanical shutter operation timing 221 that defines the end of the exposure time is set ahead of the readout timing 222. In the mechanical shutter operation timing 221, the exposure end time in units of regions (in the present example, in units of row blocks) is set.

As illustrated in FIG. 10(B), the delay in time between rows of the mechanical shutter operation timing 221 is smaller than the delay in time between rows of the readout timing executed as a focal plane operation.

To be specific, the operation time Tm (all) of the mechanical shutter from the head row to the bottom row is calculated with the following expression:

$$Tm(\text{all}) = TmN - Tm1$$

where,

Tm1 represents the operation timing of the mechanical shutter of the head row, and TmN is the operation timing of the mechanical shutter of the bottom row.

Meanwhile, the operation time Tread(all) of the pixel readout processing from the head row to the bottom row is calculated with the following expression:

$$Tread(\text{all}) = TreadN - Tread1$$

where,

Tread1 represents the readout timing of the head row, and TreadN represents the readout timing of the bottom row. As understood from FIG. 10(B), $$(TmN - Tm1) < (TreadN - Tread1)$$

That is,

Tm(all) < Tread(all)

That is, by using the mechanical shutter for the control of the end time of the exposure period, the time gaps of the exposure period end time from the upper end row to the bottom row can be reduced.

As a result, for example, when a moving object is photographed or when the photographing is performed with the camera being moved, the photographing of the object in which the upper end and the lower end of the photographed image are in almost the same period of time becomes possible, and a high-quality image in which no distortion occurs or the distortion is suppressed, as illustrated with reference to FIG. 5 can be generated and output.

[5. Other Embodiments]

Next, other configuration examples of the image pickup apparatus according to the present invention will be described.

The image pickup device (CMOS image sensor) 203 in the above-described embodiment has a configuration that enables the control of an arbitrary exposure time where a unit of the exposure time control is a units of row, that is in units of rows as illustrated in FIG. 8.

However, the unit of control of the exposure time is not limited to the unit of row, and can be set to various units of regions of the image pickup device other than the row.

For example, by combining the above-described technique of the present invention and the configurations disclosed in the above-described Patent Documents 3 and 4 and Non Patent Document 1, control in which a different exposure time in each arbitrary region is possible.

As the unit of the exposure control is not limited to the unit of row, and a configuration of performing control in each pixel, or in each block made of a plurality of pixels is possible. For example, by using an image pickup device having a configuration in which the reset signal that controls the exposure start time described with reference to FIG. 10(*b*) is input in each pixel, or in each pixel block, the exposure time setting in each pixel or in each pixel block becomes possible.

Figure 11:
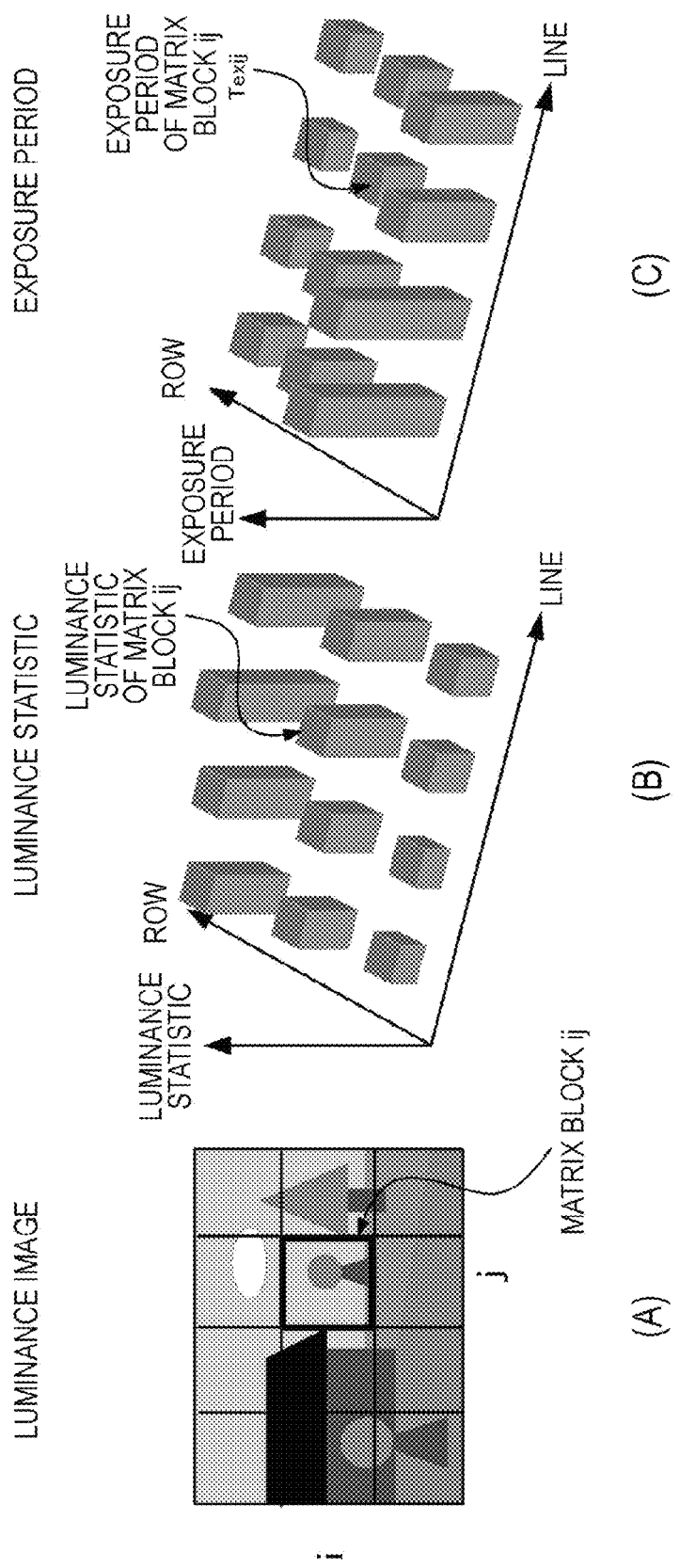
FIG. 11 is a diagram describing exposure control processing in units of matrix blocks.

For example, like FIG. 11, a configuration in which block division is performed in units of matrices, and the exposure time control is performed in each matrix block is possible.

An exposure time calculation unit 206 inputs the luminance information in units of image regions from a signal processing unit 204. For example, a luminance image illustrated in FIG. 11(A) is obtained.

The luminance image illustrated in FIG. 11(A) is configured from luminance information of pixels of an object in a photographed image.

The exposure time calculation unit 206 first divides the luminance image obtained from the signal processing unit 204 in units of matrix blocks made of one or more rows and lines as illustrated in FIG. 11(A).

Note that an identifier of the matrix block is indicated as a matrix block ij, using a row-direction identifier of block, which corresponds to the number of blocks from above: i, and a line-direction identifier of block, which corresponds to the number of blocks from left: j The matrix block ij indicates a matrix block corresponding to a i-th block from above and a j-th block from left.

Next, the exposure time calculation unit 206 calculates a luminance statistic in units of matrix blocks as illustrated in FIG. 11(B). The axes of FIG. 11(B) represent a row, line, and luminance statistic. The luminance statistic is a statistic expressing the brightness of matrix blocks. For example, a luminance average value of a block and the like are used.

In this way, the exposure time calculation unit 206 obtains the luminance image illustrated in FIG. 11(A) from the signal processing unit 204, and generates the luminance statistic in units of regions (in the present embodiment, in units of matrix blocks) illustrated in FIG. 11(B).

Further, the exposure time calculation unit 206 calculates an exposure time to be set in units of regions (in the present example, in units of matrix blocks) as illustrated in FIG. 11(C) based on the luminance statistic in units of regions illustrated in FIG. 11(B).

Note that, as described above, the exposure time in the units of regions is calculated based on a preliminary picked-up image in photographing a still image, and is applied to a next still image photographed by the user.

In the processing of photographing a moving image, the exposure time is calculated based on a preceding photographed image, and is applied to a next photographed image frame.

The exposure time calculation unit 206 performs the following processing in calculating the exposure time:

setting a short exposure time in a bright region, that is, a high luminance region, and setting a long exposure time in a dark region, that is, a low luminance region.

By executing such setting of the exposure time in units of regions, the saturation of pixel values in the high luminance region can be prevented, and an effective pixel value can be obtained. In addition, a pixel value having a high S/N can be obtained in the low luminance region.

The exposure time calculation unit 206 determines, by the above-described processing, the exposure time in units of regions (in the present example, in units of matrix blocks), and outputs the determined exposure time information in units of regions to the electronic shutter control unit 207.

The electronic shutter control unit 207 determines an electronic shutter operation timing at which a reset signal (R) that functions as a front curtain that starts the exposure time is output, from the information, in units of matrix blocks.

In this case, a focal-plane shutter operation and a mechanical shutter operation are controlled in units of rows, similarly to the control described with reference to FIG. 10 above. As for a reset operation serving as exposure start is independently controlled in the row direction and in the line direction.

An electronic shutter timing Trij of the row i and the line j, which outputs the reset signal (R) that functions as a front curtain that starts the exposure time of the matrix block ij is calculated with the following expression:

$$Trij = Tmi - Texij$$

where,

Tmi represents an operation timing of the mechanical shutter in the matrix block ij, and Texij represents the exposure time in the matrix block ij (see FIG. 11(c)).

The exposure time control in units of matrix blocks that are various pixel sets is realized by the above-described exposure time control.

Figure 12:
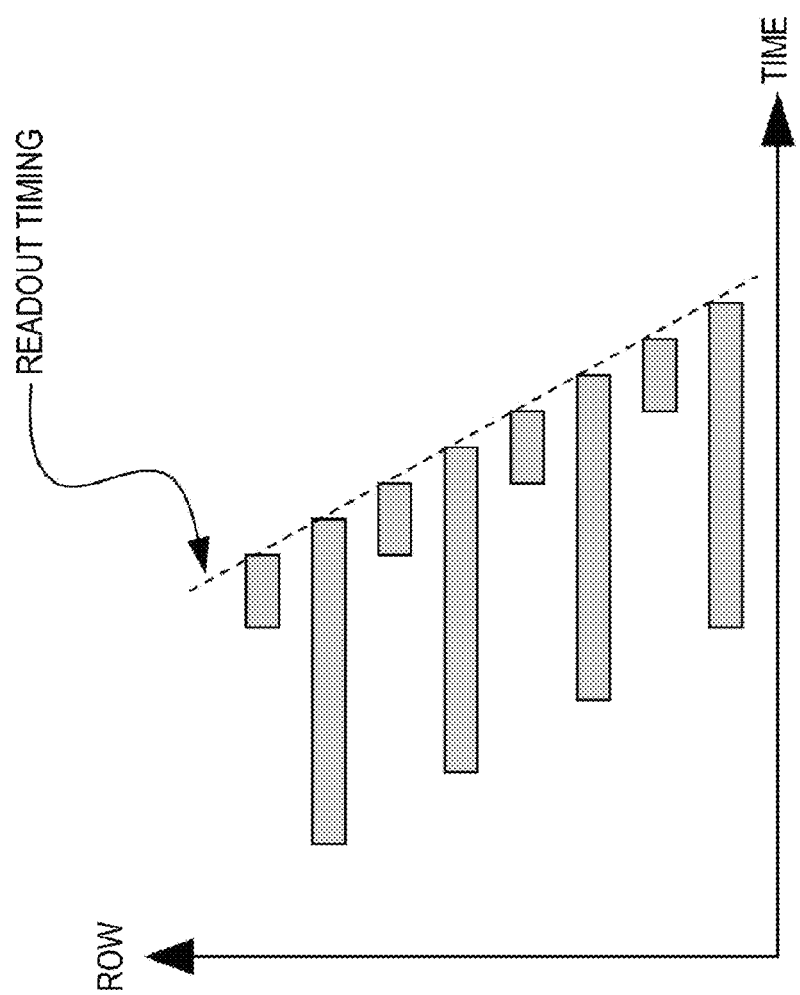
FIG. 12 is a diagram describing an example of exposure time control in units of predetermined regions.

Further, in the above-described embodiments, a configuration has been described, in which the exposure time of a next photographed image in units of regions is controlled based on the luminance information of an image photographed in advance. However, as another example, a configuration of periodically controlling different exposure times, as illustrated in FIG. 12 may be employed.

Figure 13:
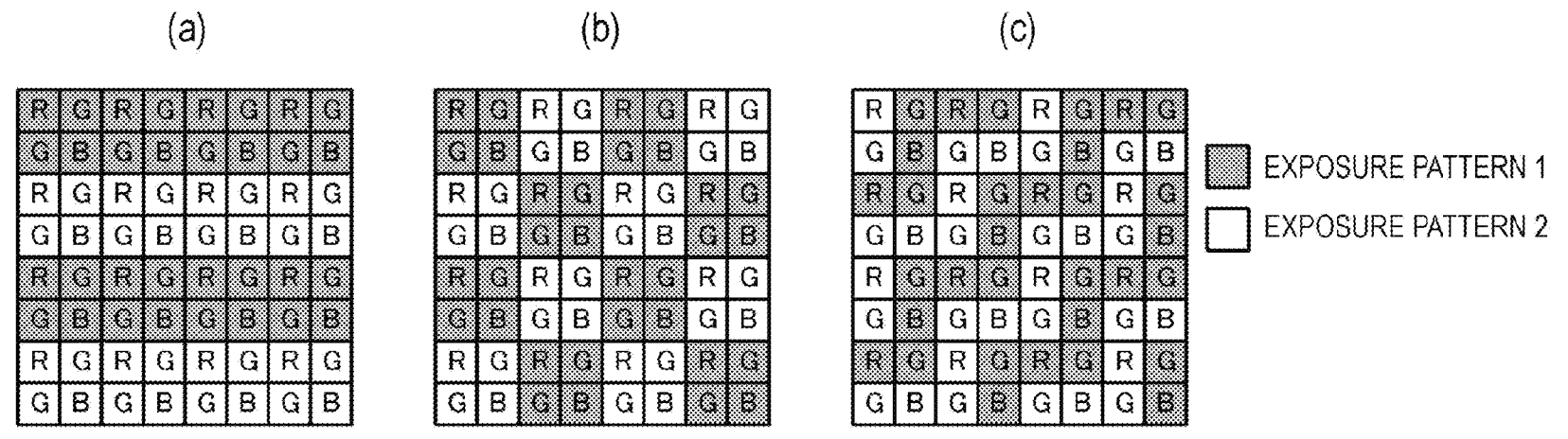

As a setting example of the unit of exposure control, control can be performed in various units of regions, such as in units of pixels, in a particular pixel cycle, and with a pixel pattern, as illustrated in FIG. 13. FIG. 13 is a diagram describing an example of region division of an image pickup device that performs the exposure time control in units of predetermined regions.

FIG. 13(a) illustrates an example in which setting of two exposure times is performed in units of two rows.

FIG. 13(b) illustrates an example in which setting of two exposure times is performed in units of four pixels.

FIG. 13(c) illustrates an example in which setting of two exposure times is performed in units of lines of three pixels both in horizontal and vertical directions.

By configuring an image pickup device that enables an output of the reset signal described with reference to FIG. 10(b), in units of various regions as described above, and by outputting the reset signal to the image pickup device in units of regions, the exposure time control in units of regions having various forms other than the unit of row becomes possible.

[6. Correction Processing Responding to an Operation Change of a Mechanical Shutter]

Next, an embodiment having a correction processing configuration responding to an operation change of a mechanical shutter will be described.

Figure 7:
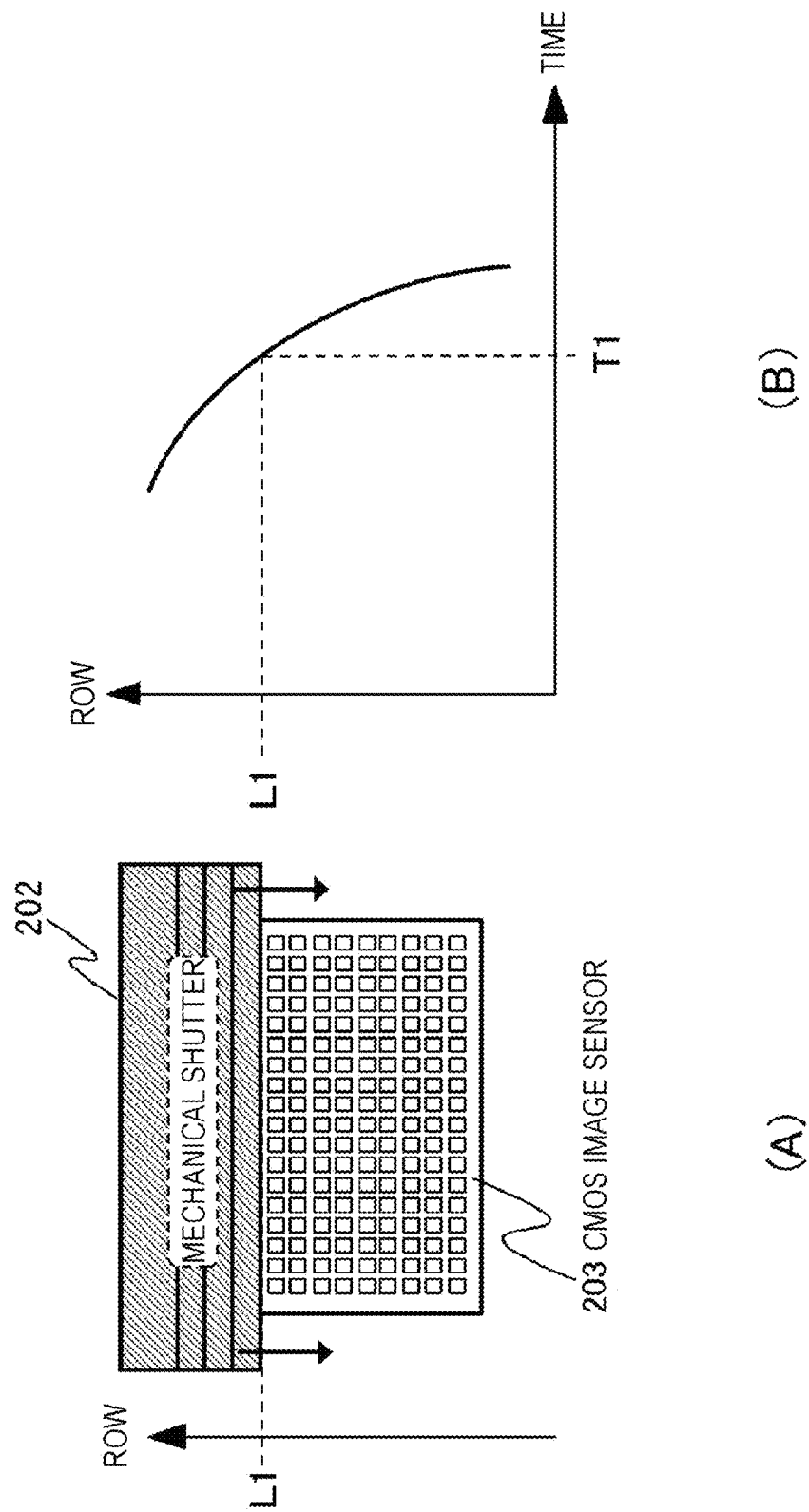
FIG. 7 is a diagram describing a configuration and an operation example of a mechanical shutter.

In the above-described embodiments, as described with reference to FIG. 7, it has been described assuming that the scanning speed of the mechanical shutter is known and the scanning speed is not changed. However, the scanning speed of the mechanical shutter may be changed due to aging or other changes in electrical and mechanical characteristics.

In such a case, if the processing using the calculation expression of an output timing of an electronic shutter (reset signal (R)) described with reference to FIG. 8 above, a wrong exposure time may be set.

To be specific, when the output timing of the electronic shutter (reset signal (R)) is calculated using the following expression that calculates the electronic shutter timing Tri in the exposure time calculation unit 206, there is a possibility that an exposure time (Texi) to be controlled cannot be obtained.

$$Tri = Tmi - Texi$$

where,

Tmi represents an operation timing of the mechanical shutter in the row i, and

Texi represents the exposure time in the row i.

That is, in the above expression, there is a possibility of generating an error caused by the change of [Tmi] that is an operation timing of the mechanical shutter in the row i.

Figure 14:
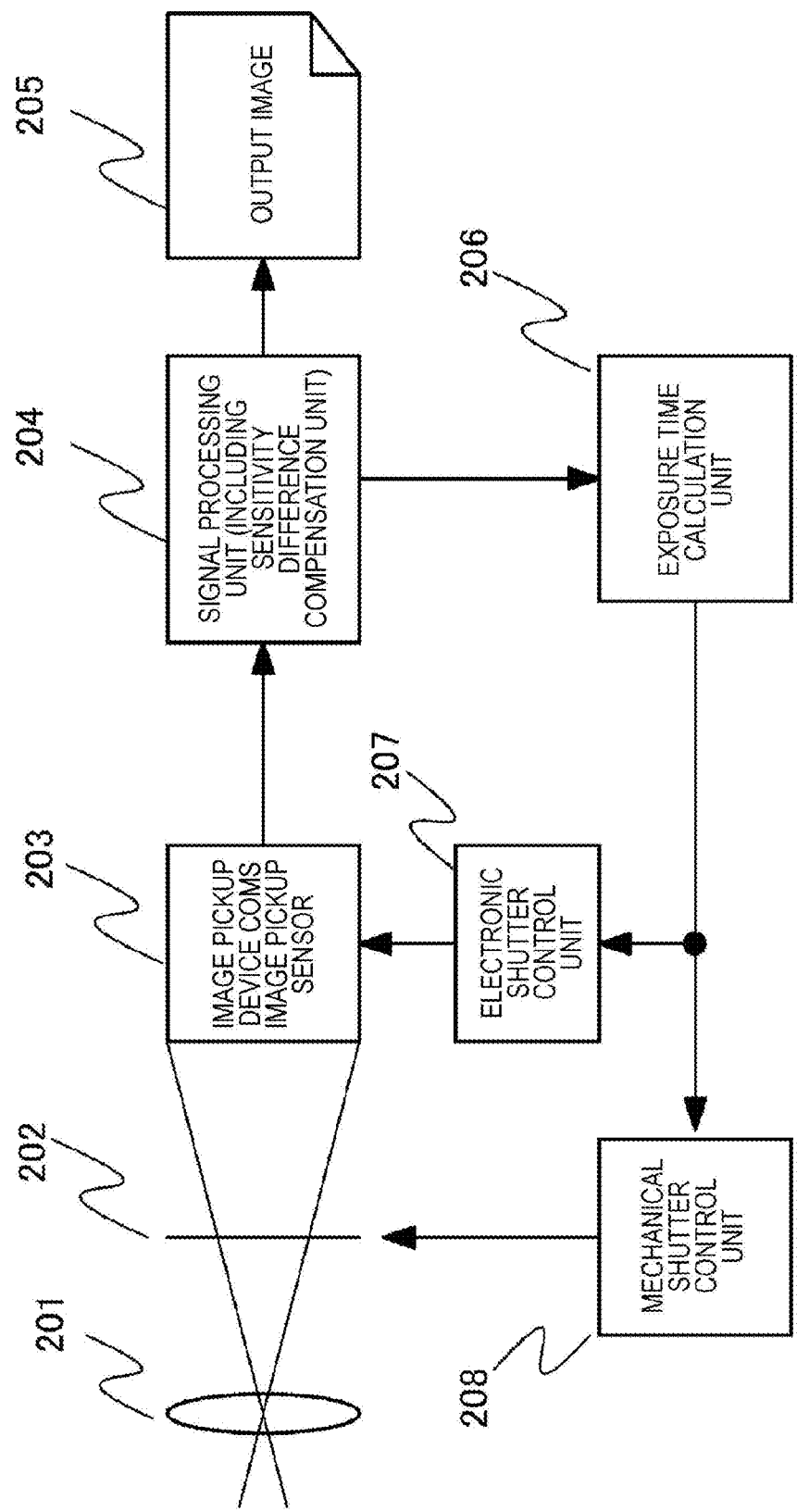
FIG. 14 is a diagram describing a configuration and processing of an image pickup apparatus having a sensitivity difference compensation unit.

Hereinafter, to prevent such a generation of an error, a configuration example provided with a sensitivity difference compensation unit in a signal processing unit 204 as illustrated in FIG. 14 will be described.

A processing example of the sensitivity difference compensation unit configured in the signal processing unit 204 will be described.

In photographing a still image, the exposure time calculation unit 206 obtains a luminance image from a camera signal processing unit 204 by performing preliminary image pickup.

For example, the luminance image is the one described with reference to FIG. 9(a) above.

In preliminary photographing for obtaining luminance information, an image is obtained only by a focal-plane shutter operation by electronic shutter scanning and readout scanning. That is, preliminary photographing for obtaining a luminance image is performed without using the mechanical shutter to define an end time of the exposure period.

With this preliminary photographing processing, the luminance statistic can be calculated without being subject to the mechanical shutter.

Following that, as actual photographing, the photographing processing described with reference to FIG. 10 of the above-described embodiment, that is, a photographed image is obtained by controlling an exposure start time using an electronic shutter (reset signal (R)), and controlling the exposure end time using the mechanical shutter.

At the time of this actual photographing, the reset signal (R) is output according to an electronic shutter timing Tri calculated with the following expression, which is an expression of the electronic shutter timing Tri calculated in the exposure time calculation unit 206:

$$Tri = Tmi - Texi$$

When the value of [Tmi] in the above expression, that is, the operation timing of the mechanical shutter in the row i is correct, assuming that an object is not moved from start of preliminary photographing to end of actual photographing, the luminance statistic calculated from an image by the preliminary photographing and the luminance statistic calculated from an image by the actual photographing are supposed to be exactly equal.

However, when the scanning speed of the mechanical shutter is changed due to aging, for example, and the value [Tmi] in the above expression, that is, the operation timing of the mechanical shutter in the row [i] is changed, an actual exposure time at the time of image photographing processing is different from an anticipated exposure time [Texi] when control according to the above expression is performed.

As a result, the luminance statistic of the region has a different value by the gap between the exposure times.

A luminance difference occurs in the corresponding regions of the preliminary photographed image and of the actual photographed image due to the gap between the exposure times.

The sensitivity difference compensation unit of the signal processing unit 204 illustrated in FIG. 14 calculates the luminance difference between the corresponding image regions of the preliminary photographed image and of the actual photographed image, and calculates a gap of the operation timing of the mechanical shutter, and a gap of the exposure time at the time of the actual photographing.

Further, the sensitivity difference compensation unit calculates, from the calculated values, a pixel value when a correct exposure time is set, and performs image correction processing in which the calculated pixel value, that is, a pixel value when a proper exposure time is set, is set to a pixel value of an output image to generate the output image.

By performing the image correction in this way, even if there is a change in the operation of the mechanical shutter, an output image in which a corrected pixel value is set according to a correct exposure time can be generated and output.

Note that, as a setting example of the unit of exposure control, a plurality of examples illustrated in FIG. 13 has been described, regarding various units of regions, such as by units of pixels, in a particular pixel cycle, and with a pixel pattern. However, other setting examples can be further employed. For example, configurations illustrated in FIGS. 15(a) to 15(h) are possible.

FIG. 15(a) illustrates an example having a similar configuration to FIG. 13(a), and in which setting of two exposure times is performed in units of two rows.

FIG. 15(b) illustrates an example having a similar configuration to FIG. 13(b), and in which setting of two exposure times is performed in units of four pixels.

FIG. 15(c) illustrates an example having a similar configuration to FIG. 13(c), and in which setting of two exposure times is performed in units of lines of three pixels both in horizontal and vertical directions.

FIG. 15(d) illustrates an example in which setting of two exposure times is performed in units of two rows.

FIG. 15(e) illustrates an example in which setting of two exposure times is performed in units of one row.

FIG. 15(f) illustrates an example in which setting of two exposure times is performed in units of one pixel.

FIG. 15(g) illustrates an example in which setting of two exposure times is performed in units of one row.

FIG. 15(h) is an example in which a predetermined pattern is set in units of four rows, and setting of two exposure times is performed.

With these various units of regions, the image pickup device capable of outputting a reset signal described with reference to FIG. 10(b) is configured, and it is configured such that the reset signal is output to the image pickup device in units of regions, whereby exposure time control in units of regions having various forms other than the units of rows becomes possible.

As described above, the present invention has been described in detail with reference to the specific embodiments. However, it is apparent a person skilled in the art can achieve alteration and substitution of the embodiments without departing from the gist of the present invention. That is, the present invention has been exemplarily disclosed, and should not be interpreted in a limited manner. To judge the gist of the present invention, the section of the claims should be considered.

Further, the series of processing described in the specification can be executed by hardware, software, or a composite configuration of both of them. When the processing by software is executed, a program in which processing sequence is recorded can be installed into a memory in a computer incorporated in dedicated hardware and executed, or can be installed into a general-purpose computer capable of executing various types of processing and executed. For example, the program can be recorded on a recording medium in advance. Other than installing the program from the recording medium to the computer, the program can be received through a network such as a local area network (LAN), and the Internet, and can be installed into a recording medium such as a built-in hard disk.

Note that the various types of processing described in the specification is not only executed in time series according to the description, but also may be executed in parallel or in an individual manner according to processing ability of the device that executes the processing or as necessary. Further, the system in the present specification is a theoretical assembled configuration made of a plurality of devices, and is not limited to one having devices in configurations in the same housing.

INDUSTRIAL APPLICABILITY

As described above, according to an embodiment of the present invention, an apparatus and a method are provided, which realize setting of an exposure time in units of regions in an image pickup apparatus, and photographing of an image having reduced image distortion.

To be specific, an electronic shutter control unit that controls an exposure start time of the image pickup device by an electronic shutter operation, and a mechanical shutter control unit that controls an exposure end time of the image pickup device by a mechanical shutter operation are included. The electronic shutter control unit calculates an exposure start time in units of image regions based on an exposure time individually set in units of predetermined image regions, such as in units of row blocks, and an operation time of a mechanical shutter in units of image regions, and operates an electronic shutter at the calculated exposure start time in units of image regions.

For example, the exposure time is subtracted from the mechanical shutter operation time in units of row blocks, and a reset time as the exposure start time is calculated as an electronic shutter operation time, so that exposure time control in units of regions is executed.

With this processing, exposure control set in an arbitrary exposure time becomes possible in units of image regions, and a time difference between the exposure end times can be reduced by the mechanical shutter, whereby, for example, the image distortion likely to occur at the time of photographing a moving object can be reduced.

REFERENCE SIGNS LIST

101 Image pickup device
102 Vertical scanning circuit
103 Horizontal scanning circuit
104 Pixel
111 Horizontal reset line
112 Horizontal select line
113 Vertical signal line
114 Signal output line
201 Optical lens
202 Mechanical shutter
203 Image pickup device
204 Signal processing unit 205 Output image
206 Exposure time calculation unit
207 Electronic shutter control unit
208 Mechanical shutter control unit

The invention claimed is:

1. An image pickup apparatus comprising:
an image pickup device;
an electronic shutter control unit configured to control an exposure start time of the image pickup device by an electronic shutter operation;
a mechanical shutter control unit configured to control an exposure end time of the image pickup device by a mechanical shutter operation,
wherein the electronic shutter control unit is configured to calculate the exposure start time in units of image regions based on an exposure time individually set in units of image regions, and an operation time of a mechanical shutter in units of image regions, and control an electronic shutter to operate at the calculated exposure start time in units of image regions;
an exposure time calculation unit configured to calculate an exposure time of a subsequently photographed image in units of image regions according to luminance information in units of image regions obtained from a preliminarily photographed image; and
a sensitivity difference compensation unit configured to calculate a difference between the calculated exposure time of the subsequently photographed image in units of image regions and an actual exposure time of the subsequently photographed image in units of image regions, and to execute pixel value correction based on the calculated difference.

2. The image pickup apparatus according to claim 1, wherein the electronic shutter control unit is configured to calculate the exposure start time in units of image regions based on the exposure time in units of image regions calculated by the exposure time calculation unit, and an operation time of the mechanical shutter in units of image regions, and control the electronic shutter to operate at the calculated exposure start time in units of image regions.

3. The image pickup apparatus according to claim 1, wherein the exposure time calculation unit is configured to execute exposure time calculation processing in units of image regions, in which
the exposure time of the subsequently photographed image is set to be a long time for an image region having low luminance in units of image regions and obtained from the preliminarily photographed image, and
the exposure time of the subsequently photographed image is set to be a short time for an image region having high luminance in units of image regions and obtained from the preliminarily photographed image.

4. The image pickup apparatus according to claim 1, wherein the exposure time calculation unit is configured to calculate the exposure time of subsequently photographed image frame in units of image regions according to the luminance information obtained from a preceding photographed image frame of an image frame configuring a photographed moving image when the moving image is photographed.

5. The image pickup apparatus according to claim 1, wherein
the exposure time calculation unit is configured to calculate the exposure time in units of row blocks configured from one or more rows as an image region according to luminance information based on the preliminarily photographed image, wherein the electronic shutter control unit is configured to calculate the exposure start time in units of image regions based on the exposure time in units of row blocks calculated by the exposure time calculation unit, and an operation time of the mechanical shutter in units of row blocks, and
control the electronic shutter to operate at the calculated exposure start time in units of image regions, and
calculate an exposure start time Tri of a row block i according to the following expression:

$$Tri = Tmi - Texi$$

where a row block number is i,
the exposure time of the row block i is Texi, and
a mechanical shutter operation time of the row block i is Tmi.

6. The image pickup apparatus according to claim 1, wherein
the exposure time calculation unit is configured to calculate the exposure time in units of matrix blocks configured from one or more pixels as an image region according to luminance information based on the preliminarily photographed image,
wherein the electronic shutter control unit is configured to calculate the exposure start time in units of image regions based on the exposure time in units of matrix blocks calculated by the exposure time calculation unit, and an operation time of the mechanical shutter in units of matrix blocks, and
control the electronic shutter to operate at the calculated exposure start time in units of image regions, and
calculate an exposure start time Trij of a matrix block ij according to the following expression:

$$Trij = Tmi - Texij$$

where a row block number is i, a line block number is j,
the exposure time of the matrix block ij is Texij, and
a mechanical shutter operation time of the matrix block ij is Tmi.

7. The image pickup apparatus according to claim 1, wherein
the image pickup device is configured to execute pixel value readout processing in units of rows in sequence, and
the mechanical shutter control unit is configured to control the mechanical shutter to operate at a time preceding the pixel value readout processing of the image pickup device to terminate the exposure time.

8. The image pickup apparatus according to claim 1, wherein the electronic shutter control unit is configured to
output a reset signal resetting an electric charge accumulated in each pixel of the image pickup device, in units of image regions of the image pickup device,
set the exposure time of a unit of each image region as a time from outputting of the reset signal to the operation time of the mechanical shutter, and
perform exposure time control in units of image regions.

9. The image pickup apparatus according to claim 1, wherein
the sensitivity difference compensation unit is configured to execute luminance comparison between the preliminarily photographed image photographed without operating the mechanical shutter and the subsequently photographed image photographed with operating the mechanical shutter, to calculate the difference between the calculated exposure time in units of regions set to the subsequently photographed image and the actual exposure time of the subsequently photographed image in units of regions based on information of the luminance comparison, and to execute the pixel value correction compensating the calculated difference between the calculated exposure time and the actual exposure time.

10. The image pickup apparatus according to claim 1, further comprising:
a signal processing unit configured to input an image output by the image pickup device by image pickup processing in which different exposure times are set in units of image regions, and to calculate a pixel value of the output image by multiplying a gain corresponding to a reciprocal number of the exposure time to the input image.

11. A method of controlling an image pickup apparatus executed in the image pickup apparatus, the method comprising:
controlling an exposure start time of an image pickup device by an electronic shutter operation;
controlling an exposure end time of the image pickup device by a mechanical shutter operation;
calculating the exposure start time in units of image regions based on an exposure time individually set in units of image regions, and an operation time of a mechanical shutter in units of image regions;
controlling an electronic shutter to operate at the calculated exposure start time in units of image regions;
calculating an exposure time of a subsequently photographed image in units of image regions according to luminance information in units of image regions obtained from a preliminarily photographed image;
calculating a difference between the calculated exposure time of the subsequently photographed image in units of image regions and an actual exposure time of the subsequently photographed image in units of image regions; and
executing pixel value correction based on the calculated difference.

12. A computer-readable storage device encoded with computer-executable instructions that, when executed by a processing device, perform a method for causing an image pickup apparatus to execute image pickup processing comprising:
controlling an exposure start time of an image pickup device by an electronic shutter operation;
controlling an exposure end time of the image pickup device by a mechanical shutter operation;
calculating the exposure start time in units of image regions based on an exposure time individually set in units of image regions, and an operation time of a mechanical shutter in units of image regions;
controlling an electronic shutter to operate at the calculated exposure start time in units of image regions;
calculating an exposure time of a subsequently photographed image in units of image regions according to luminance information in units of image regions obtained from a preliminarily photographed image;
calculating a difference between the calculated exposure time of the subsequently photographed image in units of image regions and an actual exposure time of the subsequently photographed image in units of image regions; and
executing pixel value correction based on the calculated difference.

\* \* \* \* \*